US012579877B2

(12) United States Patent
Lance et al.

(10) Patent No.: US 12,579,877 B2
(45) Date of Patent: Mar. 17, 2026

(54) ELECTRONIC PLUMBING SYSTEM INCLUDING FALL DETECTION AND ALERTS

(71) Applicant: Fortune Brands Water Innovations LLC, North Olmsted, OH (US)

(72) Inventors: Matthew J. Lance, North Ridgeville, OH (US); Matthew Benjamin Nicholls, Rocky River, OH (US)

(73) Assignee: Fortune Brands Water Innovations LLC, Deerfield, IL (US)

( * ) Notice: Subject to any disclaimer, the term of this patent is extended or adjusted under 35 U.S.C. 154(b) by 75 days.

(21) Appl. No.: 18/472,803

(22) Filed: Sep. 22, 2023

(65) Prior Publication Data

US 2024/0105042 A1 Mar. 28, 2024

Related U.S. Application Data

(60) Provisional application No. 63/409,483, filed on Sep. 23, 2022.

(51) Int. Cl.
*G08B 21/04* (2006.01)

(52) U.S. Cl.
CPC ....... *G08B 21/043* (2013.01); *G08B 21/0461* (2013.01)

(58) Field of Classification Search
CPC .......................... G08B 21/043; G08B 21/0461
(Continued)

(56) References Cited

U.S. PATENT DOCUMENTS 7,714,728 B2 5/2010 Koblasz
10,902,611 B2 * 1/2021 Chen ...................... G06T 7/194
(Continued)

FOREIGN PATENT DOCUMENTS

CN 107818660 A 3/2018
CN 110720926 A 1/2020

OTHER PUBLICATIONS

Author unknown, Life Alert product(s) (available at https://www.lifealert.com/—retrieved on Apr. 23, 2024), at least a version of the product(s) shown on the website is believed to have been publicly available prior to Sep. 23, 2022 (12 pages).
(Continued)

*Primary Examiner* — Zhen Y Wu
(74) *Attorney, Agent, or Firm* — Calfee, Halter & Griswold LLP

(57) ABSTRACT

The present invention provides an electronic plumbing system including fall detection and alerts. The system comprises a body, a user input/output module, and a processor. The body is operable to be mounted on a surface. The user input/output module is operable to communicate with a user regarding operation of the system and includes a fall sensor and at least one of a communication device and a monitor. The fall sensor is operable to be mounted on the body, define a detection zone, and detect a fall of a user in the detection zone. The communication device is operable to be mounted within a first proximity to the body. The monitor is operable to be mounted within a second proximity to the body. The processor is operable to communicate with the fall sensor and at least one of the communication device and the monitor regarding the operation of the system.

20 Claims, 11 Drawing Sheets

(58) Field of Classification Search
USPC ........................................................ 340/573.1
See application file for complete search history.

(56) References Cited

U.S. PATENT DOCUMENTS

| | | | | |
|---|---|---|---|---|
| 2002/0007510 | A1* | 1/2002 | Mann | E03C 1/057<br>4/300 |
| 2017/0050201 | A1* | 2/2017 | Deivasigamani | B05B 12/10 |
| 2019/0069810 | A1* | 3/2019 | Suematsu | A61B 5/11 |
| 2020/0134836 | A1* | 4/2020 | Chen | G06T 7/254 |
| 2020/0143656 | A1 | 5/2020 | Li et al. | |
| 2020/0163590 | A1* | 5/2020 | Lin | G06N 3/04 |
| 2020/0166610 | A1* | 5/2020 | Lin | G01S 13/0209 |
| 2020/0166611 | A1 | 5/2020 | Lin et al. | |
| 2021/0262209 | A1* | 8/2021 | Santha | B05B 1/18 |
| 2022/0020257 | A1* | 1/2022 | Kechichian | G08B 21/0492 |
| 2022/0049867 | A1* | 2/2022 | Rexach | F24F 7/003 |
| 2022/0390132 | A1* | 12/2022 | Behnke | F24F 11/56 |

OTHER PUBLICATIONS

Author unknown, Aloe Care Health product(s) (available at https://www.aloecare.com/—retrieved on Apr. 23, 2024), at least a version of the product(s) shown on the website is believed to have been publicly available prior to Sep. 23, 2022 (10 pages).
Author unknown, EchoCare product(s) (available at https://www.echocare-tech.com/—retrieved on Apr. 23, 2024), at least a version of the product(s) shown on the website is believed to have been publicly available prior to Sep. 23, 2022 (4 pages).
Author unknown, Nobi product(s) (available at https://www.nobi.life/—retrieved on Apr. 23, 2024), at least a version of the product(s) shown on the website is believed to have been publicly available prior to Sep. 23, 2022 (12 pages).
Author unknown, Vayyar Care product(s) (available at https://www.vayyarhome.com/—retrieved on Apr. 23, 2024), at least a version of the product(s) shown on the website is believed to have been publicly available prior to Sep. 23, 2022 (9 pages).

* cited by examiner

ELECTRONIC PLUMBING SYSTEM INCLUDING FALL DETECTION AND ALERTS

CROSS-REFERENCE TO RELATED APPLICATION

This application claims the benefit of U.S. Provisional Application No. 63/409,483, filed Sep. 23, 2022, the entire disclosure of which is hereby incorporated by reference.

FIELD

The present invention relates generally to an electronic plumbing system including fall detection and alerts and, more particularly, to an electronic showering system including fall detection and alerts.

BACKGROUND

Electronic plumbing systems, such as electronic showering systems, are well known. Such electronic plumbing systems are used in residential and commercial applications, such as in bathrooms and various other locations. Users desire to use electronic plumbing systems. Many difficulties can be encountered in using electronic plumbing systems.

SUMMARY

The present invention provides an electronic plumbing system including fall detection and alerts.

In an exemplary embodiment, the system comprises a body, a user input/output module, and a processor. The body is operable to be mounted on a surface. The body includes a discharge outlet. The discharge outlet is operable to deliver water. The user input/output module is operable to communicate with a user regarding operation of the system. The user input/output module includes a fall sensor and at least one of a communication device and a monitor. The fall sensor is operable to be mounted on the body. The fall sensor is operable to define a detection zone. The fall sensor is operable to detect a fall of a user in the detection zone. The communication device is operable to be mounted within a first proximity to the body. The monitor is operable to be mounted within a second proximity to the body. The processor is operable to communicate with the fall sensor and at least one of the communication device and the monitor regarding the operation of the system. The fall sensor is operable to detect a fall of a user in the detection zone and to send a signal to the processor indicating the detected fall of the user in the detection zone. The processor is operable to receive the signal from the fall sensor and to send a signal to at least one of the communication device and the monitor in response to the detected fall of the user in the detection zone. At least one of the communication device is operable to receive the signal from the processor and to communicate with the user regarding the detected fall of the user in the detection zone and the monitor is operable to receive the signal from the processor and to communicate with a caretaker regarding the detected fall of the user in the detection zone.

In an exemplary embodiment, the system comprises a body, a valve, a user input/output module, and a processor. The body is operable to be mounted on a surface. The body includes a discharge outlet. The discharge outlet is operable to deliver water. The valve is operable to permit flow of water through the discharge outlet when the valve is activated and to not permit flow of water through the discharge outlet when the valve is deactivated. The user input/output module is operable to communicate with a user regarding operation of the system. The user input/output module includes a fall sensor and at least one of a communication device and a monitor. The fall sensor is operable to be mounted on the body. The fall sensor is operable to define a detection zone. The fall sensor is operable to detect a fall of a user in the detection zone. The communication device is operable to be mounted within a first proximity to the body. The monitor is operable to be mounted within a second proximity to the body. The processor is operable to communicate with the fall sensor and at least one of the communication device and the monitor regarding the operation of the system. The fall sensor is operable to detect a fall of a user in the detection zone and to send a signal to the processor indicating the detected fall of the user in the detection zone. The processor is operable to receive the signal from the fall sensor and to send a signal to at least one of the communication device and the monitor in response to the detected fall of the user in the detection zone. At least one of the communication device is operable to receive the signal from the processor and to communicate with the user regarding the detected fall of the user in the detection zone and the monitor is operable to receive the signal from the processor and to communicate with a caretaker regarding the detected fall of the user in the detection zone.

In an exemplary embodiment, the system comprises a body, an electronic valve, a user input/output module, and a processor. The body is operable to be mounted on a surface. The body includes a discharge outlet. The discharge outlet is operable to deliver water. The electronic valve is operable to permit flow of water through the discharge outlet when the electronic valve is activated and to not permit flow of water through the discharge outlet when the electronic valve is deactivated. The user input/output module is operable to communicate with a user regarding operation of the system. The user input/output module includes a fall sensor and at least one of a communication device and a monitor. The fall sensor is operable to be mounted on the body. The fall sensor is operable to define a detection zone. The fall sensor is operable to detect a fall of a user in the detection zone. The communication device is operable to be mounted within a first proximity to the body. The monitor is operable to be mounted within a second proximity to the body. The processor is operable to communicate with the fall sensor and at least one of the electronic valve, the communication device, and the monitor regarding the operation of the system. The fall sensor is operable to detect a fall of a user in the detection zone and to send a signal to the processor indicating the detected fall of the user in the detection zone. The processor is operable to receive the signal from the fall sensor and to send a signal to at least one of the electronic valve, the communication device, and the monitor in response to the detected fall of the user in the detection zone. At least one of the electronic valve is operable to receive the signal from the processor and to control the water flowing through the discharge outlet, the communication device is operable to receive the signal from the processor and to communicate with the user regarding the detected fall of the user in the detection zone, and the monitor is operable to receive the signal from the processor and to communicate with a caretaker regarding the detected fall of the user in the detection zone.

DETAILED DESCRIPTION

The present invention provides an electronic plumbing system including fall detection and alerts. In exemplary embodiments, the electronic plumbing system is an electronic showering system. However, one of ordinary skill in the art will appreciate that the electronic plumbing system could be another type of electronic plumbing system. In exemplary embodiments, the electronic plumbing system includes an electronic plumbing device. In exemplary embodiments, the electronic plumbing device is an electronic showerhead. However, one of ordinary skill in the art will appreciate that the electronic plumbing system could include another type of electronic plumbing device, such as an electronic handheld shower, or multiple types of electronic plumbing devices.

Figure 2A:
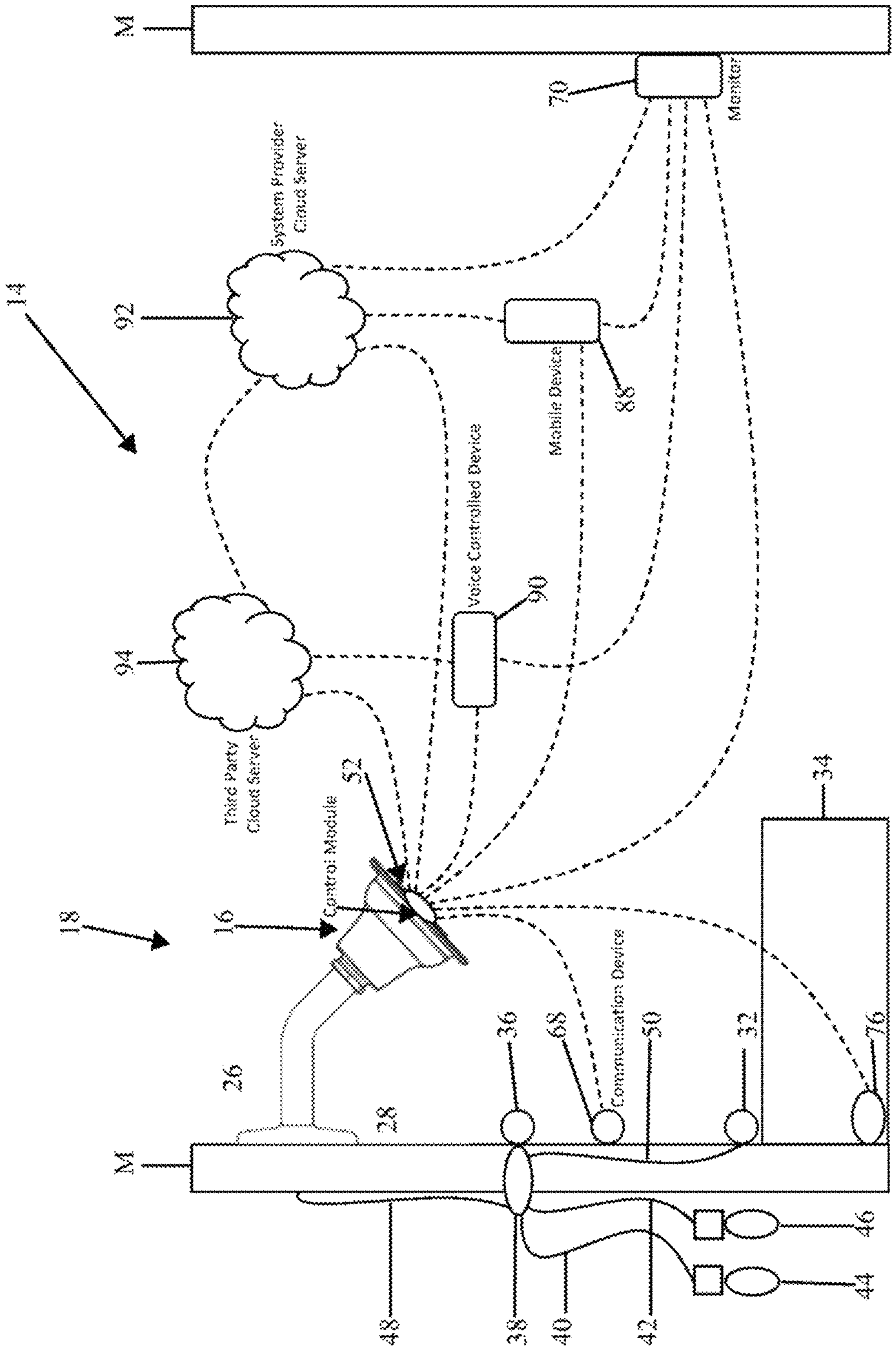
FIGS. 2a-2b are illustrations of fluidic and electrical/electronic components of electronic showering systems including electronic showerheads according to exemplary embodiments of the present invention.
Figure 2B:
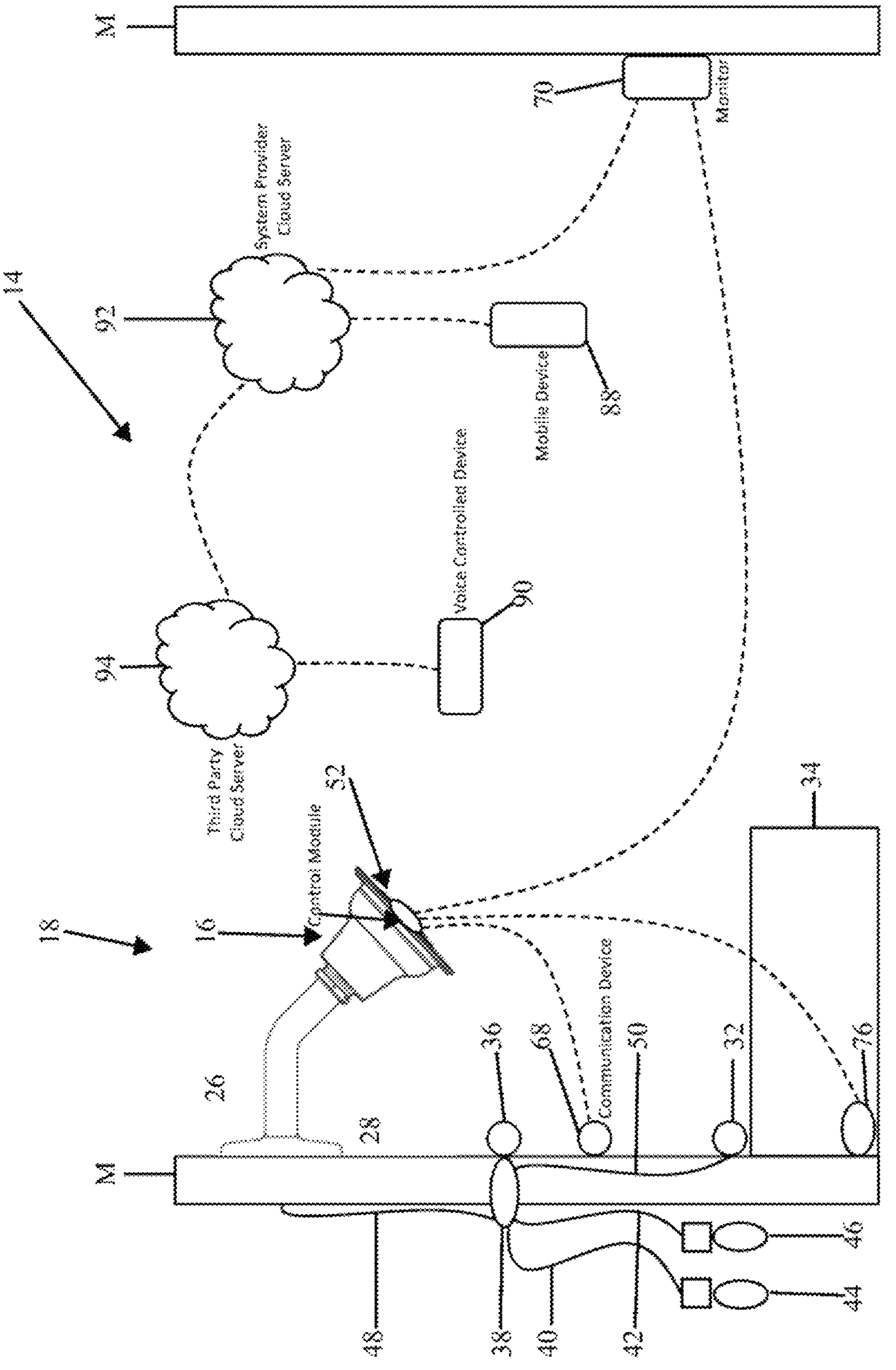
Figure 3A:
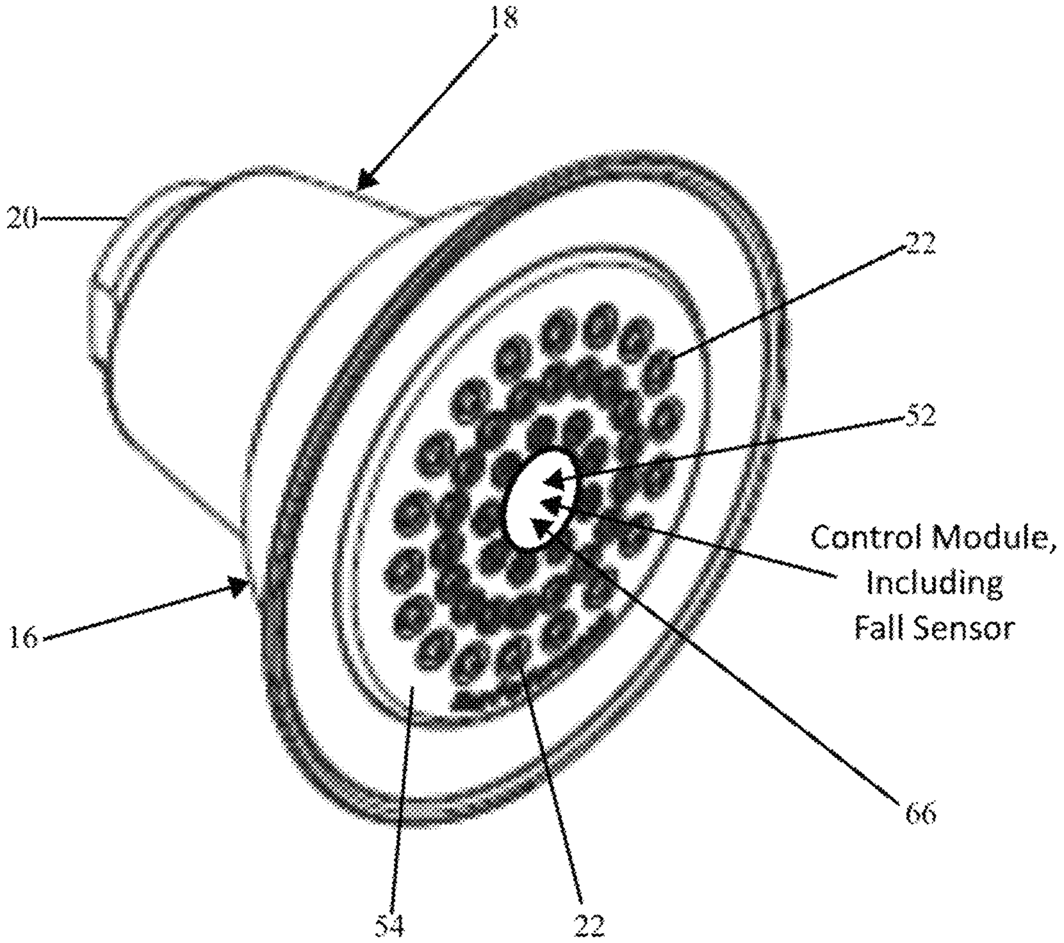
FIGS. 3a-3b are illustrations of fluidic and electrical/electronic components of an electronic showerhead according to an exemplary embodiment of the present invention.
Figure 3B:
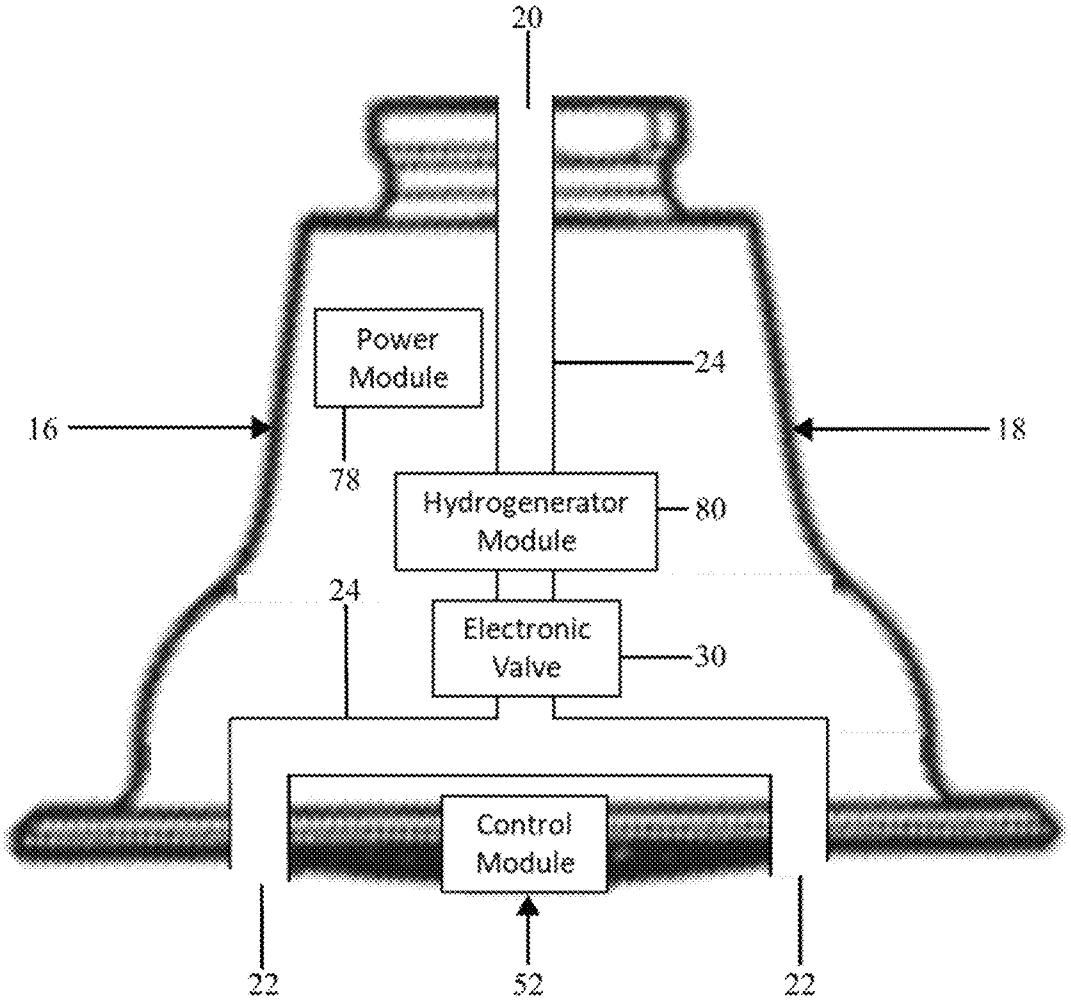

Exemplary embodiments of electronic plumbing systems 10 including electronic plumbing devices 12 are illustrated in FIGS. 1a-1f. FIGS. 1a-1f primarily show the electrical/electronic components and connections of the electronic plumbing systems 10. Exemplary embodiments of electronic showering systems 14 including electronic showerheads 16 are illustrated in FIGS. 2a-2b. FIGS. 2a-2b show the fluidic and electrical/electronic components of the electronic showering systems 14 including the electronic showerheads 16. An exemplary embodiment of an electronic showerhead 16 is illustrated in FIGS. 3a-3b. FIGS. 3a-3b show the fluidic and electrical/electronic components of the electronic showerhead 16.

In exemplary embodiments, the electronic plumbing systems 10 (such as the electronic showering systems 12) include a body 18. The body 18 is operable to be mounted (directly or indirectly) on a mounting surface M (such as a shower wall). An upstream end of the body 18 includes an inlet 20. The inlet 20 is connected (directly or indirectly) to a downstream end of a water line. A downstream end of the body 18 includes a discharge outlet 22. The discharge outlet 22 is operable to deliver water from the body 18. A flow path 24 extends between the inlet 20 and the discharge outlet 22 of the body 18.

In exemplary embodiments, as best shown in FIGS. 2a-2b and 3a-3b, the body 18 includes the electronic showerhead 16. An upstream end of the electronic showerhead 16 includes the inlet 20. The inlet 20 is connected to a downstream end of a mounting arm 26. An upstream end of the mounting arm 26 extends through a mounting escutcheon 28 and the mounting surface M (such as the shower wall). The mounting escutcheon 28 is connected to the mounting surface M (such as the shower wall). A downstream end of the electronic showerhead 16 includes the discharge outlet 22. The discharge outlet 22 is operable to deliver water from the electronic showerhead 16. The flow path 24 extends between the inlet 20 and the discharge outlet 22 of the electronic showerhead 16.

In exemplary embodiments, as best shown in FIGS. 2a-2b and 3a-3b, the body 18 includes the mounting arm 26 and the electronic showerhead 16. The upstream end of the mounting arm 26 includes the inlet 20. The inlet 20 is connected to the downstream end of the water line. The upstream end of the mounting arm 26 extends through the mounting escutcheon 28 and the mounting surface M (such as the shower wall). The mounting escutcheon 28 is connected to the mounting surface M (such as the shower wall). The downstream end of the electronic showerhead 16 includes the discharge outlet 22. The discharge outlet 22 is operable to deliver water from the electronic showerhead 16. The flow path 24 extends between the inlet 20 of the mounting arm 26 and the discharge outlet 22 of the electronic showerhead 16.

In exemplary embodiments, the electronic plumbing system 10 (such as the electronic showering system 14) includes a valve 30. The valve 30 is operable to permit flow of water through the discharge outlet 22 when the valve 30 is activated and to not permit flow of water through the discharge outlet 22 when the valve 30 is deactivated. For a mechanical valve, the valve 30 is activated when the valve 30 is opened, and the valve 30 is deactivated when the valve 30 is closed.

In the illustrated embodiments, as best shown in FIGS. 1a-1d and 3b, the valve 30 is an electronic valve. The electronic valve 30 is in the flow path 24 of the electronic showerhead 16 between the inlet 20 and the discharge outlet 22. The electronic valve 30 is operable to permit flow of water through the discharge outlet 22 when the electronic valve 30 is activated and to not permit flow of water through the discharge outlet 22 when the electronic valve 30 is deactivated. In exemplary embodiments, the electronic valve 30 is an electronic shutoff valve.

In the illustrated embodiments, as best shown in FIGS. 2a-2b, the electronic plumbing system 10 (such as the electronic showering system 14) includes a tub spout 32 and a vessel 34. The tub spout 32 is operable to be mounted on the mounting surface M (such as the shower wall) on which the electronic plumbing device 12 (such as the electronic showerhead 16) is mounted. The vessel 34 is operable to be mounted below the tub spout 32. Tub spouts and vessels are well known in the art and will not be described in detail. Additionally, in the illustrated embodiments, as best shown in FIGS. 2a-2b, the electronic plumbing system 10 (such as the electronic showering system 14) includes a handle 36 and a mixing valve 38. The handle 36 is operable to be mounted on the mounting surface M (such as the shower wall) on which the electronic plumbing device 12 (such as the electronic showerhead 16) is mounted. The mixing valve 38 is operable to be mounted in the mounting surface M (such as the shower wall) on which the electronic plumbing device 12 (such as the electronic showerhead 16) is mounted. Again, handles and mixing valves are well known in the art and will not be described in detail.

In the illustrated embodiments, as best shown in FIGS. 2a-2b, the electronic plumbing system 10 (such as the electronic showering system 14) includes a hot water line 40 and a cold water line 42. An upstream end of the hot water line 40 connects to a hot water supply 44, and an upstream end of the cold water line 42 connects to a cold water supply 46. A downstream end of the hot water line 40 connects to the mixing valve 38, and a downstream end of the cold water line 42 connects to the mixing valve 38.

In the illustrated embodiments, as best shown in FIGS. 2a-2b, the electronic plumbing system 10 (such as the electronic showering system 14) includes a showerhead mixed water line 48 and a tub spout mixed water line 50. An upstream end of the showerhead mixed water line 48 connects to the mixing valve 38. A downstream end of the showerhead mixed water line 48 connects to the upstream end of the mounting arm 26 and, thus, delivers mixed water to the electronic plumbing device 12 (such as the electronic showerhead 16) via the mounting arm 26. The showerhead mixed water is delivered from the electronic showerhead 16 via the flow path 24 from the inlet 20 to the discharge outlet 22 of the electronic showerhead 16. An upstream end of the tub spout mixed water line 50 connects to the mixing valve 38. A downstream end of the tub spout mixed water line 50 connects to the tub spout 32 and, thus, delivers mixed water to the vessel 34 via the tub spout 32.

In exemplary embodiments, each portion of the hot water line 40, the cold water line 42, the showerhead mixed water line 48, the tub spout mixed water line 50, and the flow path 24 includes at least one hose, pipe, or passage. However, one of ordinary skill in the art will appreciate that each portion of the hot water line 40, the cold water line 42, the showerhead mixed water line 48, the tub spout mixed water line 50, and the flow path 24 could include more than one hose, pipe, or passage. Similarly, each portion of the hot water line 40, the cold water line 42, the showerhead mixed water line 48, the tub spout mixed water line 50, and the flow path 24 could include a combination of hose(s), pipe(s), and/or passage(s). If a portion of the hot water line 40, the cold water line 42, the showerhead mixed water line 48, the tub spout mixed water line 50, and the flow path 24 includes more than one hose, pipe, and/or passage, the hose(s), pipe(s), and/or passage(s) are connected via connectors.

When reference is made to one component of the electronic plumbing system 10 connecting to another component of the electronic plumbing system 10, the connection may be direct or indirect. One of ordinary skill in the art will appreciate that additional components may be needed if the connection is indirect.

In the illustrated embodiments, the electronic plumbing system 10 includes the electronic valve 30 and, more particularly, the electronic shutoff valve. However, one of ordinary skill in the art will appreciate that the electronic plumbing system 10 could include one or more electronic valves. Additionally, the electronic plumbing system 10 could include one or more mechanical valves, either in parallel or in series with the electronic valve(s).

In exemplary embodiments, the electronic valve 30 is the electronic shutoff valve and, more particularly, a solenoid valve. However, one of ordinary skill in the art will appreciate that the electronic valve 30 could be any type of electronic valve, including, but not limited to, a proportional valve (and, more particularly, a stepper motor actuated valve) and an electronic throttle valve.

In the illustrated embodiments, as best shown in FIGS. 1a-1f, 2a-2b, and 3a-3b, the electronic plumbing system 10 includes a control module 52. In the illustrated embodiments, as best shown in 2a-2b and 3a-3b, the electronic showerhead 16 includes the control module 52. In exemplary embodiments, the control module 52 is operable to be mounted on the electronic plumbing system 10 (such as the electronic showering system 14). In exemplary embodiments, the control module 52 is operable to be mounted on the electronic plumbing device 12 (such as the electronic showerhead 16). In the illustrated embodiments, as best shown in FIGS. 2a-2b and 3a-3b, the control module 52 is mounted on a sprayface 54 of the electronic showerhead 16. More specifically, in the illustrated embodiments of FIGS. 2a-2b and 3a-3b, the control module 52 is mounted on a center of the sprayface 54 of the electronic showerhead 16. However, one of ordinary skill in the art will appreciate that the control module 52 could be mounted in other locations on and/or around the electronic plumbing system 10.

In the illustrated embodiments, as best shown in FIGS. 1a-1f, the control module 52 includes a number of electronic components. These components control the operation of the electronic plumbing system 10. More specifically, these components enable the activation, deactivation, and control of the electronic plumbing system 10. In the illustrated embodiments, the control module 52 includes a printed circuit board ("PCB") 56. In the illustrated embodiments, a number of electronic components are mounted on the PCB 56, including, but not limited to, a processor 58, memory 60, a wireless communication chip or module 62, a power management integrated circuit ("PMIC") chip or module 64, and a fall sensor 66. The processor 58 is operable to receive signals from and send signals to the components of the electronic plumbing system 10 to control the operation of the electronic plumbing system 10. For example, the processor 58 is operable to receive signals from the fall sensor 66 and other components of the electronic plumbing system 10 and send signals to the electronic valve 30 and other components of the electronic plumbing system 10 to activate, deactivate, and control the electronic plumbing system 10. The memory 60 is operable to save information received from the components of the electronic plumbing system 10. The wireless communication chip or module 62 is operable to control wireless communication between the components of the electronic plumbing system 10. The PMIC chip or module 64 is operable to control power to the components of the electronic plumbing system 10. The fall sensor 66 is operable to detect a presence of a user and a fall of a user of the electronic plumbing system 10 and send signals to the components of the electronic plumbing system 10.

In the illustrated embodiments, as best shown in FIGS. 1a-1f and 2a-2b, the electronic plumbing system 10 includes a communication device 68. The communication device 68 is operable to receive input from a user and/or other components of the electronic plumbing system 10 and/or provide output to a user and/or other components of the electronic plumbing system 10. In exemplary embodiments, the communication device 68 is operable to be mounted within a first proximity (i.e., distance) to the body 18. In the illustrated embodiments, the communication device 68 is operable to be mounted on the mounting surface M (such as the shower wall) on which the electronic plumbing device 12 (such as the electronic showerhead 16) is mounted.

In the illustrated embodiments, as best shown in FIGS. 1a-1f and 2a-2b, the electronic plumbing system 10 includes a monitor 70. The monitor 70 is operable to receive input from a user and/or other components of the electronic plumbing system 10 and/or provide output to a user and/or other components of the electronic plumbing system 10. In exemplary embodiments, the monitor 70 is operable to be mounted within a second proximity (i.e., distance) to the body 18. In the illustrated embodiments, the monitor 70 is operable to be mounted on a wall in a vicinity of the wall on which the electronic plumbing device 12 (such as the electronic showerhead 16) is mounted. However, one of ordinary skill in the art will appreciate that the monitor 70 could be mounted on other mounting surfaces and in locations that are not in the vicinity of the mounting surface M (such as the shower wall) on which the electronic plumbing device 12 (such as the electronic showerhead 16) is mounted.

In the illustrated embodiments, as best shown in FIGS. 2*a*-2*b*, the first proximity within which the communication device 68 is mounted to the body 18 is less than the second proximity within which the monitor 70 is mounted to the body 18. However, one of ordinary skill in the art will appreciate that the first proximity within which the communication device 68 is mounted to the body 18 could be the same as or greater than the second proximity within which the monitor 70 is mounted to the body 18.

In the illustrated embodiments, as best shown in FIGS. 1*a*-1*f*, the monitor 70 includes a processor 72 and memory 74. The signals received from and sent to the components of the electronic plumbing system 10 to control the operation of the electronic plumbing system 10 can be received from and sent to the processor 72 in the monitor 70 in addition to or alternatively to the processor 58 in the control module 52. Similarly, the information received from the components of the electronic plumbing system 10 can be saved in the memory 74 in the monitor 70 in addition to or alternatively to the memory 60 in the control module 52.

In the illustrated embodiments, as best shown in FIGS. 1*a*-1*f* and 2*a*-2*b*, the electronic plumbing system 10 includes an electronic drain fitting 76. The electronic drain fitting 76 is operable to open and close a drain from the vessel 34 into which the electronic plumbing device 12 (such as the electronic showerhead 16) delivers water. In exemplary embodiments, the electronic drain fitting 76 is operable to be mounted on the vessel 34 into which the electronic plumbing device 12 (such as the electronic showerhead 16) delivers water.

Figure 1A:
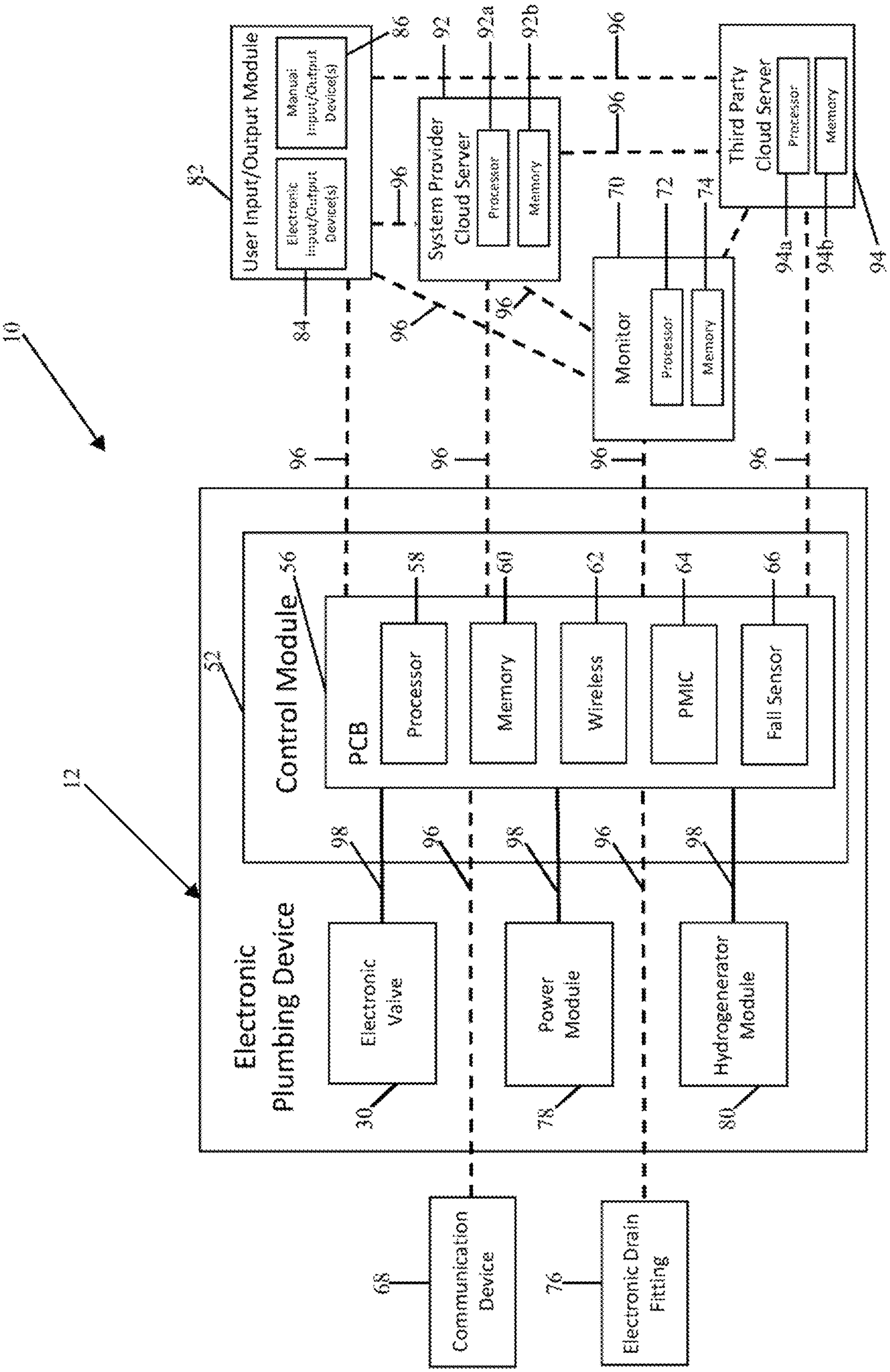
FIGS. 1*a*-1*f* are schematic illustrations of electrical/electronic components of electronic plumbing systems including electronic plumbing devices according to exemplary embodiments of the present invention.
Figure 1B:
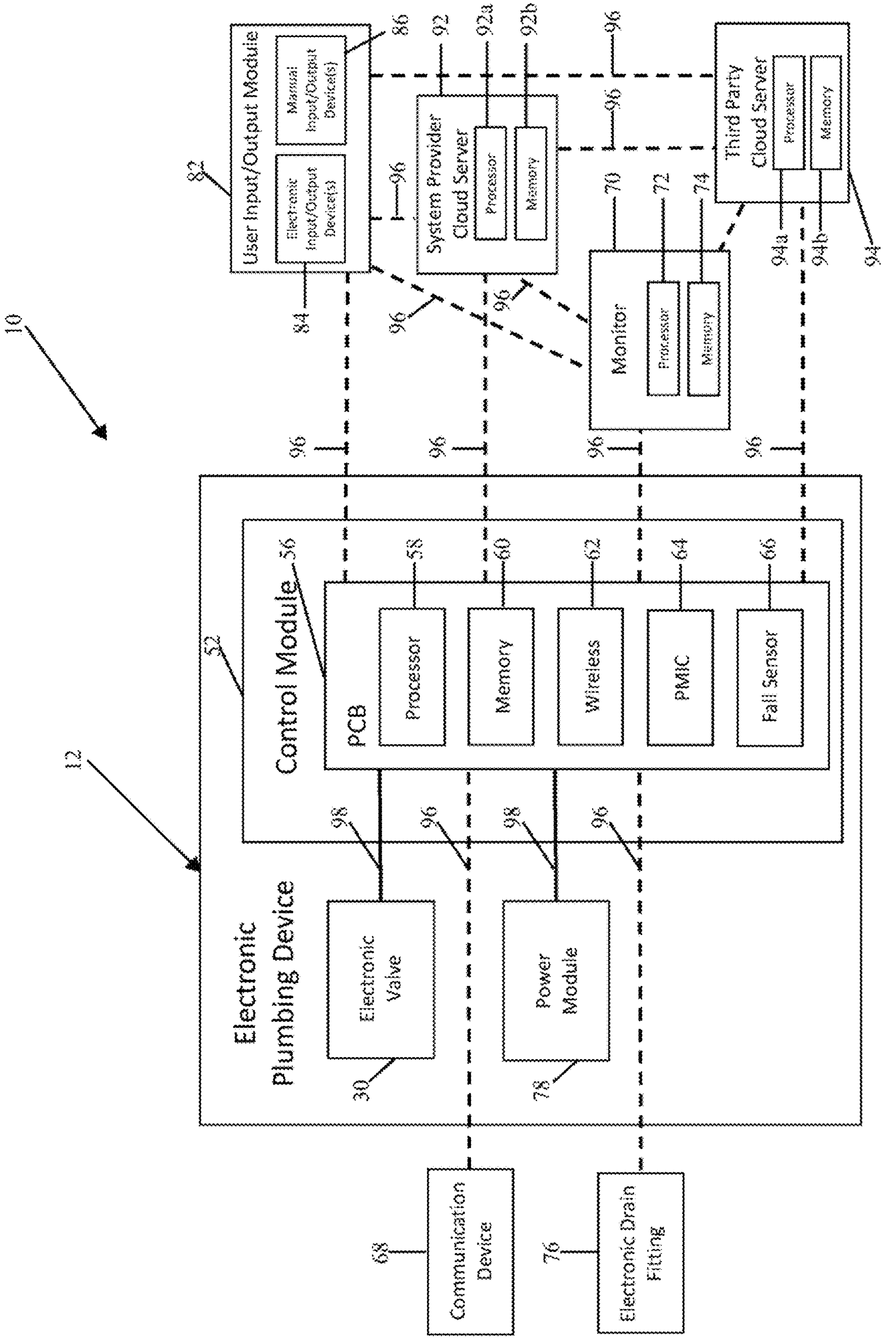
Figure 1C:
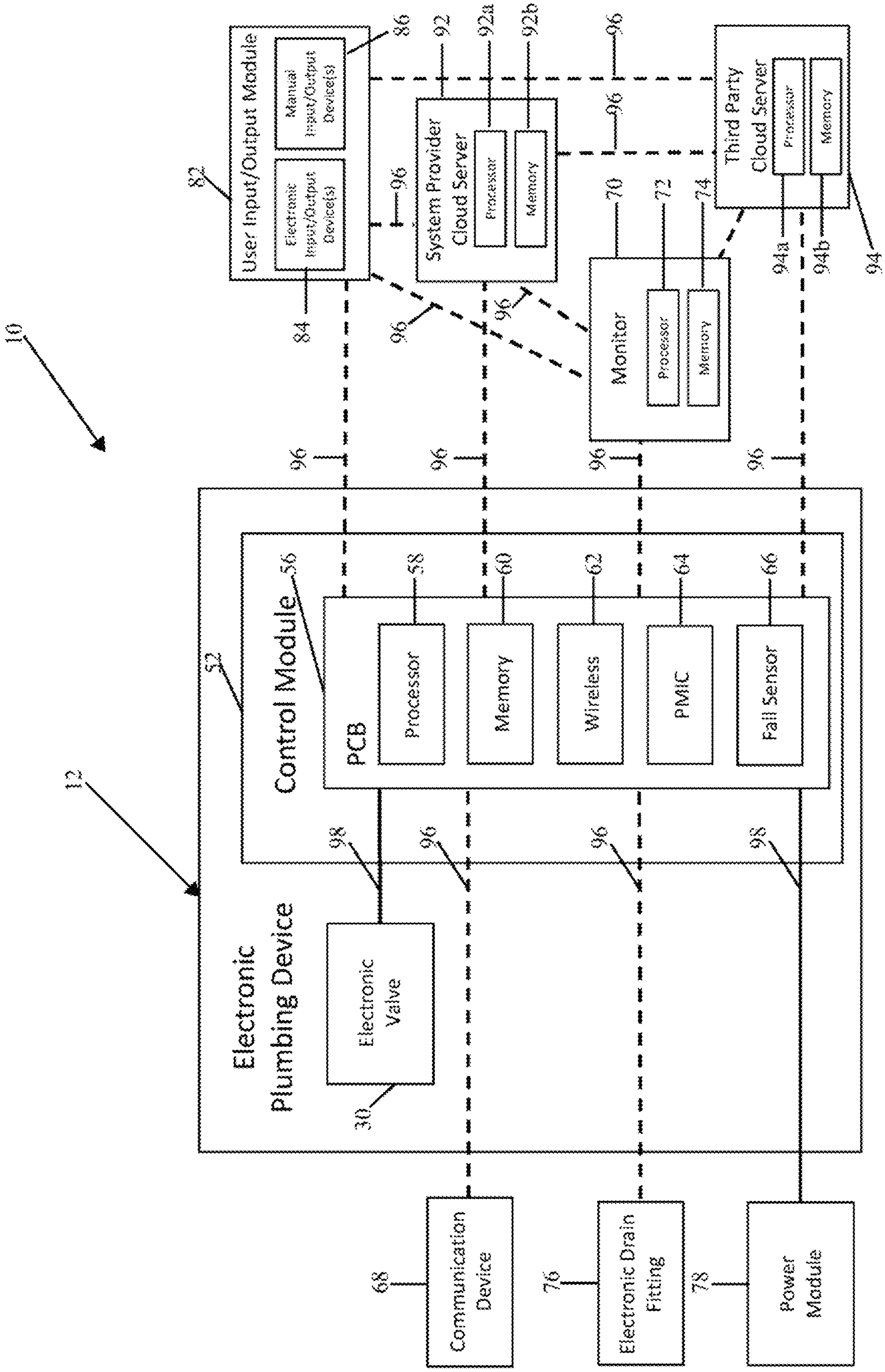
Figure 1D:
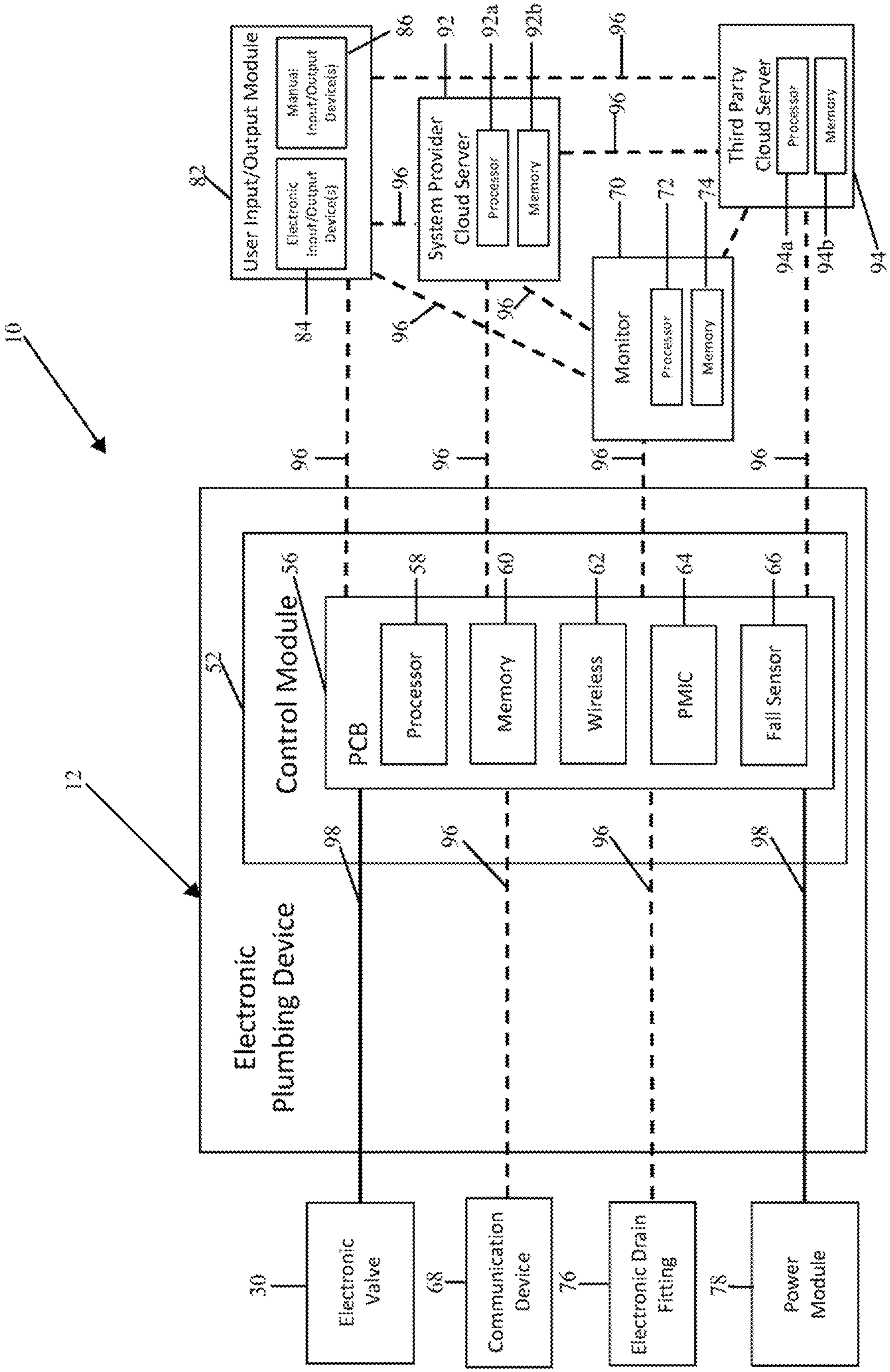
Figure 1E:
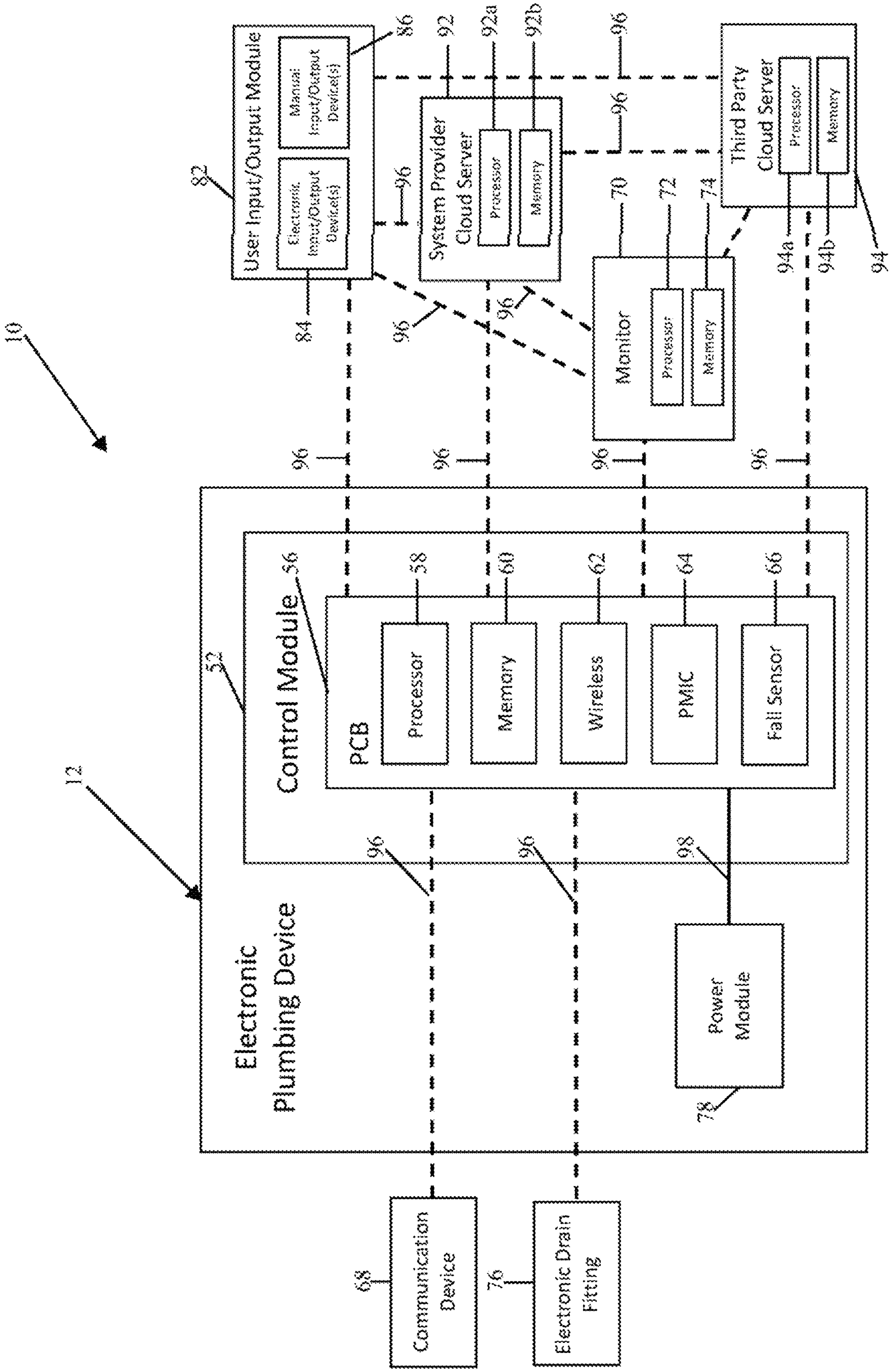
Figure 1F:
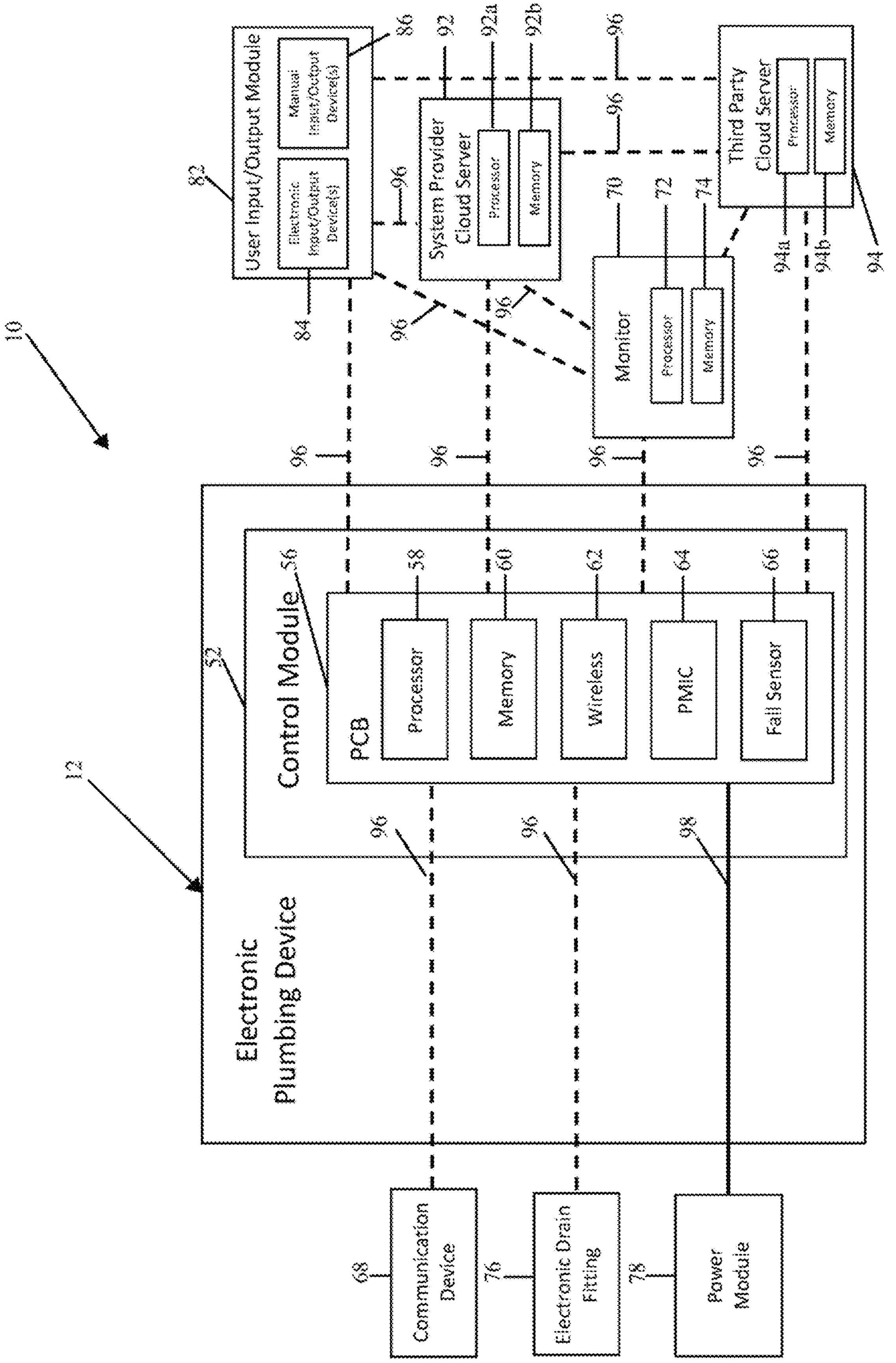

In the illustrated embodiments, as best shown in FIGS. 1*a*-1*f* and 3*b*, the electronic showerhead 16 includes a power module 78. The power module 78 is operable to provide power to the components of the electronic plumbing system 10. In exemplary embodiments, as best shown in FIGS. 1*a*, 1*b*, and 1*c*, the power module 78 is operable to be mounted in the electronic plumbing device 12. In exemplary embodiments, as best shown in FIGS. 1*c*, 1*d*, and 1*f*, the power module 78 is operable to be mounted outside the electronic plumbing device 12. In exemplary embodiments, as best shown in FIG. 3*b*, the power module 78 is operable to be mounted in the electronic showerhead 16. In exemplary embodiments, the power module 78 includes battery power. In exemplary embodiments, the power module 78 includes AC power.

In the illustrated embodiments, as best shown in FIGS. 1*a* and 3*b*, the electronic showerhead 16 includes a hydrogenerator module 80. The hydrogenerator module 80 is operable to provide power to the components of the electronic plumbing system 10 (such as the power module 78, the control module 52, and the electronic valve 30). In exemplary embodiments, as best shown in FIG. 1*a*, the hydrogenerator module 80 is operable to be mounted in the electronic plumbing device 12. In exemplary embodiments, as best shown in FIG. 3*b*, the hydrogenerator module 80 is operable to be mounted in the electronic showerhead 16. In exemplary embodiments, the hydrogenerator module 80 is operable to provide power to recharge the power module 78, which can later be used to provide power to the components of the electronic plumbing system 10 (such as the control module 52 and the electronic valve 30). In exemplary embodiments, an amount of power required to operate the electronic plumbing system 10 and an amount of power generated by the hydrogenerator module 80 are approximately equal. In exemplary embodiments, the hydrogenerator module 80 is operable to provide power directly to the components of the electronic plumbing system 10 (such as the control module 52 and the electronic valve 30).

In the illustrated embodiments, as best shown in FIGS. 1*a*-1*f* and 2*a*-2*b*, the electronic plumbing system 10 includes a user input/output module 82. In exemplary embodiments, the user input/output module 82 is operable to receive input (e.g., information and/or instructions) from a user, provide the input to the components of the electronic plumbing system 10 (e.g., the processor), receive output (e.g., information and/or notifications) from the components of the electronic plumbing system 10 (e.g., the processor), and provide the output to a user. As used herein, user can include a monitored person whose presence or fall is being detected and/or a monitoring person who is being notified and/or alerted of a presence or a fall of the monitored person. At times, the monitoring person will be referred to as a caretaker. The monitoring person or caretaker may be known (e.g., a family member or emergency contact of the monitored person) or unknown (e.g., a private or public emergency service personnel) to the monitored person. In exemplary embodiments, the user input/output module 82 is operable to receive input from a user and send signals to the processor to control the operation of the electronic plumbing system 10. For example, the user input/output module 82 is operable to receive input from a user and send signals to the processor to activate, deactivate, and control the electronic plumbing system 10. Additionally, the user input/output module 82 is operable to receive signals from the processor and provide output to a user. The user input/output module 82 can send signals to and receive signals from the processor directly and/or indirectly (e.g., through other components of the electronic plumbing system 10 and/or through other components outside of the electronic plumbing system 10).

The user input/output module 82 can include any device that enables input from a user and/or output to a user. In exemplary embodiments, the user input/output module 82 includes electronic input/output device(s) 84 and manual input/output device(s) 86. Exemplary electronic input/output devices 84 include communication devices, monitors, mobile devices, voice controlled devices, touch screen devices, and push button devices. Exemplary manual input devices include handles and joysticks. In the illustrated embodiments of FIGS. 2*a*-2*b*, the user input/output module 82 includes four electronic input/output devices 84 and one manual input/output device 86, i.e., the communication device 68 mounted on the wall on which the electronic plumbing device 12 is mounted, the monitor 70 mounted on the wall in the vicinity of the wall on which the electronic plumbing device 12 is mounted, a mobile device 88 that can be held and/or moved by a user, a voice controlled device 90 that can be held and/or moved by a user, and the handle 36 mounted on the wall on which the electronic plumbing device 12 is mounted.

One of ordinary skill in the art will appreciate that the user input/output module 82 could include any number of devices, and each device of the user input/output module 82 could include any number of components. Moreover, one of ordinary skill in the art will appreciate that each electronic device of the user input/output module 82 could be in any location where it can, at some point in time, send signals to and/or receive signals from other components of the electronic plumbing system 10 (e.g., the processor), or each device of the user input/output module 82 could be integrally formed with or physically connected to other components of the electronic plumbing system 10 (e.g., the control module 52).

Although the electronic plumbing system 10 has been described as including the fall sensor 66, one of ordinary skill in the art will appreciate that, in certain embodiments, the electronic plumbing system 10 could include additional sensors. In exemplary embodiments, the additional sensors include a temperature sensor, a flow sensor, a pressure sensor, and/or a valve sensor. The temperature sensor is operable to detect a temperature of water in the hot water line 40, the cold water line 42, the showerhead mixed water line 48, the tub spout mixed water line 50, the flow path 24, and/or the electronic valve 30. The flow sensor is operable to detect a flow rate of water in the hot water line 40, the cold water line 42, the showerhead mixed water line 48, the tub spout mixed water line 50, the flow path 24, and/or the electronic valve 30. The pressure sensor is operable to detect a pressure of water in the hot water line 40, the cold water line 42, the showerhead mixed water line 48, the tub spout mixed water line 50, the flow path 24, and/or the electronic valve 30. The valve sensor is operable to detect a position of the electronic valve 30 and/or a motor driving the electronic valve 30. The additional sensors are operable to send signals to the processor indicating the detected information.

The information detected by the additional sensors is used to control the operation of the electronic plumbing system 10. For example, the information detected by the temperature sensor can be used to maintain a temperature of water discharged from the electronic plumbing system 10. The information detected by the flow sensor can be used to determine if there is flow or maintain a flow rate of water discharged from the electronic plumbing system 10. The information detected by the pressure sensor can be used to maintain a pressure or determine a volume of water discharged from the electronic plumbing system 10. The information detected by the valve sensor can be used to open and close the electronic valve 30.

In exemplary embodiments, the processor 58 includes an internal clock/timer. The clock/timer is operable to provide a date and a time of an action or to measure time intervals. For example, the clock/timer can provide a date and a time of an activation, a deactivation, or a control of the electronic plumbing system 10 or measure a time interval between an activation, a deactivation, and a control of the electronic plumbing system 10. In exemplary embodiments, the electronic plumbing system 10 includes an external clock/timer. Any timing of actions or steps described herein could be provided by the internal clock/timer of the processor 58 or the external clock/timer.

Additionally, in the illustrated embodiments, as best shown in FIGS. 1*a*-1*f* and 2*a*-2*b*, the electronic plumbing system 10 includes a system provider cloud server 92 and a third party cloud server 94. The system provider cloud server 92 could be hosted by a system provider (such as an electronic plumbing system manufacturer), and the third party cloud server 94 could be hosted by a third party (such as Amazon, Google, HomeKit, and IFTTT). In the illustrated embodiments, as best shown in FIGS. 1*a*-1*f*, each of the system provider cloud server 92 and the third party cloud server 94 includes a processor 92*a*, 94*a* and memory 92*b*, 94*b*. The signals received from and sent to the components of the electronic plumbing system 10 to control the operation of the electronic plumbing system 10 can be received from and sent to the processor 92*a* in the system provider cloud server 92 and/or the processor 94*a* in the third party cloud server 94 in addition to or alternatively to the processor 58 in the control module 52. Similarly, the information received from the components of the electronic plumbing system 10 can be saved in the memory 92*b* in the system provider cloud server 92 and/or the memory 94*b* in the third party cloud server 94 in addition to or alternatively to the memory 60 in the control module 52. Further, the information received from the components of the electronic plumbing system 10 can be saved in the user input/output module 82 (where the user input/output module 82 includes memory, such as an Apple iPhone and a Google Android phone).

As used herein, unless stated otherwise, "processor" includes any one or more of the processor 58 in the control module 52, the processor 72 in the monitor 70, the processor 92*a* in the system provider cloud server 92, and the processor 94*a* in the third party cloud server 94. Similarly, as used herein, unless stated otherwise, "memory" includes any one or more of the memory 60 in the control module 52, the memory 74 in the monitor 70, the memory 94*b* in the system provider cloud server 92, the memory 94*b* in the third party cloud server 94, and the memory in the user input/output module 82.

In exemplary embodiments, some components of the electronic plumbing system 10 are connected to each other via a wireless communication connection or network interface 96, while other components of the electronic plumbing system 10 are connected to each other via a wired communication connection or network interface 98. In exemplary embodiments, some components of the electronic plumbing system 10 are operable to send signals to and/or receive signals from each other via the wireless communication connection or network interface 96, while other components of the electronic plumbing system 10 are operable to send signals to and/or receive signals from each other via the wired communication connection or network interface 98.

One of ordinary skill in the art will appreciate that each component of the electronic plumbing system 10 could be connected to each other component of the electronic plumbing system 10 and send signals to and/or receive signals from each other component of the electronic plumbing system 10 via any one type or combination of different types of wireless communication connection(s) or network interface(s) 96 and/or wired communication connection(s) or network interface(s) 98. Further, one of ordinary skill in the art will appreciate that the wireless communication connection or network interface 96 and/or the wired communication connection or network interface 98 could be direct or indirect (e.g., via a router or a network hub). Moreover, one of ordinary skill in the art will appreciate that the wireless communication connection or network interface 96 could include any one type or any combination of different types of wireless communication connection(s) or network interface(s) 96, including, but not limited to, Bluetooth, Wi-Fi, near field communication (NFC), Zigbee, Z-Wave, and cellular.

In the illustrated embodiments, as best shown in FIGS. 1*a*-1*f* and 2*a*-2*b*, some components of the user input/output module 82 (e.g., the electronic input/output device(s) 84) are connected to other components of the electronic plumbing system 10 (e.g., the processor) via the wireless communication connection or network interface 96. However, one of ordinary skill in the art will appreciate that some components of the user input/output module 82 (e.g., the electronic input/output device(s) 84) could be connected to other components of the electronic plumbing system 10 (e.g., the processor) via the wired communication connection or network interface 98. In the illustrated embodiments, as best shown in FIGS. 1*a*-1*f* and 2*a*-2*b*, some components of the user input/output module 82 (e.g., the electronic input/output device(s) 84) are operable to send signals to and/or receive signals from other components of the electronic plumbing system 10 (e.g., the processor) via the wireless communication connection or network interface 96. However, one of ordinary skill in the art will appreciate that some components of the user input/output module 82 (e.g., the electronic input/output device(s) 84) could send signals to and/or receive signals from other components of the electronic plumbing system 10 (e.g., the processor) via the wired communication connection or network interface 98.

For example, in the illustrated embodiments, as best shown in FIGS. 1*a*-1*f* and 2*a*-2*b*, the mobile device 88 and the voice controlled device 90 are connected to the control module 52 via the wireless communication connection or network interface 96. As stated above, this wireless communication connection or network interface 96 could be direct or indirect. In the illustrated embodiments, as best shown in FIG. 2*b*, the mobile device 88 and the voice controlled device 90 are connected to the control module 52 via the monitor 70 and the system provider cloud server 92 and/or the third party cloud server 94 (i.e., the wireless communication connection or network interface 96 is indirect). In the illustrated embodiments, as best shown in FIG. 2*a*, the mobile device 88 and the voice controlled device 90 are connected to the control module 52 via multiple different wireless communication connections or network interfaces 96 to provide redundancy in the event of a failure of one of the wireless communication connections or network interfaces 96. As stated above, each of these wireless communication connections or network interfaces 96 could be direct or indirect.

As stated above, one of ordinary skill in the art will appreciate that each component of the user input/output module 82 could be connected to each other component of the electronic plumbing system 10 (e.g., the processor) and send signals to and/or receive signals from each other component of the electronic plumbing system 10 (e.g., the processor) via any one type or combination of different types of wireless communication connection(s) or network interface(s) 96 and/or wired communication connection(s) or network interface(s) 98. Further, one of ordinary skill in the art will appreciate that the wireless communication connection or network interface 96 and/or the wired communication connection or network interface 98 could be direct or indirect (e.g., via a router or a network hub). Moreover, one of ordinary skill in the art will appreciate that the wireless communication connection or network interface 96 could include any one type or any combination of different types of wireless communication connection(s) or network interface(s) 96, including, but not limited to, Bluetooth, Wi-Fi, near field communication (NFC), Zigbee, Z-Wave, and cellular.

In the illustrated embodiments, as best shown in FIGS. 1*a*-1*f* and 2*a*-2*b*, the system provider cloud server 92 and the third party cloud server 94 are connected to other components of the electronic plumbing system 10 (e.g., the processor) via the wireless communication connection or network interface 96. In the illustrated embodiments, as best shown in FIGS. 1*a*-1*f* and 2*a*-2*b*, the system provider cloud server 92 and the third party cloud server 94 are operable to send signals to and/or receive signals from other components of the electronic plumbing system 10 (e.g., the processor) via the wireless communication connection or network interface 96.

As stated above, one of ordinary skill in the art will appreciate that the system provider cloud server 92 and the third party cloud server 94 could be connected to other components of the electronic plumbing system 10 (e.g., the processor) and send signals to and/or receive signals from other components of the electronic plumbing system 10 (e.g., the processor) via any one type or combination of different types of wireless communication connection(s) or network interface(s) 96 and/or wired communication connection(s) or network interface(s) 98. Further, one of ordinary skill in the art will appreciate that the wireless communication connection or network interface 96 and/or the wired communication connection or network interface 98 could be direct or indirect (e.g., via a router or a network hub). Moreover, one of ordinary skill in the art will appreciate that the wireless communication connection or network interface 96 could include any one type or any combination of different types of wireless communication connection(s) or network interface(s) 96, including, but not limited to, Bluetooth, Wi-Fi, near field communication (NFC), Zigbee, Z-Wave, and cellular.

In exemplary embodiments, the additional sensors (such as the temperature sensor, the flow sensor, the pressure sensor, and/or the valve sensor) are connected to the control module 52 (and, thus, the processor) via the wired communication connection or network interface 98. In the illustrated embodiments, the additional sensors (such as the temperature sensor, the flow sensor, the pressure sensor, and the valve sensor) are operable to send signals to and/or receive signals from the control module 52 (and, thus, the processor) via the wired communication connection or network interface 98. Additionally, in the illustrated embodiments, as best shown in FIGS. 1*a*-1*f*, the power module 78 is connected to the control module 52 via the wired communication connection or network interface 98.

As stated above, one of ordinary skill in the art will appreciate that the additional sensors (such as the temperature sensor, the flow sensor, the pressure sensor, and/or the valve sensor) and the power module 78 could be connected to the control module 52 and/or other components of the electronic plumbing system 10 (e.g., the processor) and send signals to and/or receive signals from the control module 52 and/or other components of the electronic plumbing system 10 (e.g., the processor) via any one type or combination of different types of wireless communication connection(s) or network interface(s) 96 and/or wired communication connection(s) or network interface(s) 98. Further, one of ordinary skill in the art will appreciate that the wireless communication connection or network interface 96 and/or the wired communication connection or network interface 98 could be direct or indirect (e.g., via a router or a network hub). Moreover, one of ordinary skill in the art will appreciate that the wireless communication connection or network interface 96 could include any one type or any combination of different types of wireless communication connection(s) or network interface(s) 96, including, but not limited to, Bluetooth, Wi-Fi, near field communication (NFC), Zigbee, Z-Wave, and cellular.

During operation of the electronic plumbing system 10, a user activates, deactivates, and controls the electronic plumbing system 10 using the user input/output module 82. When a user appropriately triggers the user input/output module 82, the electronic plumbing system 10 is activated, deactivated, or controlled. For example, a user could trigger the user input/output module 82 by triggering the fall sensor 66, pressing an appropriate button on the communication device 68, pressing an appropriate button on the mobile device 88, and/or stating specific commands to the voice controlled device 90.

As used herein, "activate a valve" means to move the valve to or maintain the valve in an open position, regardless of the volume, temperature, or other parameter(s) for the flowing water, and "deactivate a valve" means to move the valve to a completely closed position.

When reference is made to activating or deactivating the electronic valve 30 "when a user appropriately triggers the user input/output module 82," the electronic valve 30 may be activated or deactivated immediately upon the user input/output module 82 being triggered or a predetermined period of time after the user input/output module 82 has been triggered.

In exemplary embodiments, as best shown in FIG. 2*b*, during operation of the electronic plumbing system 10 using the fall sensor 66, a user enters input via the fall sensor 66 (e.g., a user triggers the fall sensor 66). The fall sensor 66 detects the input from the user and sends a signal to the processor 58 in the control module 52 via the wired communication connection or network interface 98. The processor 58 in the control module 52 receives the signal from the fall sensor 66 and sends a signal to at least one of the communication device 68 via the wireless communication connection or network interface 96, the monitor 70 via the wireless communication connection or network interface 96, the electronic valve 30 via the wired communication connection or network interface 98, and the electronic drain fitting 76 via the wireless communication connection or network interface 96. The communication device 68, the monitor 70, the electronic valve 30, and/or the electronic drain fitting 76 receive the signal from the processor 58 in the control module 52 and, as appropriate, activate, deactivate, or control the electronic plumbing system 10.

In exemplary embodiments, as best shown in FIG. 2*b*, during operation of the electronic plumbing system 10 using the communication device 68, a user enters input via the communication device 68 (e.g., a user presses a button on the communication device 68). The communication device 68 receives the input from the user and sends a signal to the processor 58 in the control module 52 via the wireless communication connection or network interface 96. The processor 58 in the control module 52 receives the signal from the communication device 68 and sends a signal to at least one of the fall sensor 66 via the wired communication connection or network interface 98, the monitor 70 via the wireless communication connection or network interface 96, the electronic valve 30 via the wired communication connection or network interface 98, and the electronic drain fitting 76 via the wireless communication connection or network interface 96. The fall sensor 66, the monitor 70, the electronic valve 30, and/or the electronic drain fitting 76 receive the signal from the processor 58 in the control module 52 and, as appropriate, activate, deactivate, or control the electronic plumbing system 10.

In exemplary embodiments, as best shown in FIG. 2*b*, during operation of the electronic plumbing system 10 using the monitor 70, a user enters input via the monitor 70 (e.g., a user presses a button on the monitor 70). The monitor 70 receives the input from the user and sends a signal to the processor 58 in the control module 52 via the wireless communication connection or network interface 96. The processor 58 in the control module 52 receives the signal from the monitor 70 and sends a signal to at least one of the fall sensor 66 via the wired communication connection or network interface 98, the communication device 68 via the wireless communication connection or network interface 96, the electronic valve 30 via the wired communication connection or network interface 98, and the electronic drain fitting 76 via the wireless communication connection or network interface 96. The fall sensor 66, the monitor 70, the electronic valve 30, and/or the electronic drain fitting 76 receive the signal from the processor 58 in the control module 52 and, as appropriate, activate, deactivate, or control the electronic plumbing system 10.

In exemplary embodiments, as best shown in FIG. 2*b*, during operation of the electronic plumbing system 10 using the mobile device 88, a user enters input via the mobile device 88 (e.g., a user presses a button on the mobile device 88). The mobile device 88 receives the input from the user and sends a signal to the processor 92*a* in the system provider cloud server 92 via the wireless communication connection or network interface 96. The processor 92*a* in the system provider cloud server 92 receives the signal from the mobile device 88 and sends a signal to the monitor 70 via the wireless communication connection or network interface 96. The monitor 70 receives the signal from the processor 92*a* in the system provider cloud server 92 and sends a signal to the processor 58 in the control module 52. The processor 58 in the control module 52 receives the signal from the monitor 70 and sends a signal to at least one of the fall sensor 66 via the wired communication connection or network interface 98, the communication device 68 via the wireless communication connection or network interface 96, the electronic valve 30 via the wired communication connection or network interface 98, and the electronic drain fitting 76 via the wireless communication connection or network interface 96. The fall sensor 66, the communication device 68, the electronic valve 30, and/or the electronic drain fitting 76 receive the signal from the processor 58 in the control module 52 and, as appropriate, activate, deactivate, or control the electronic plumbing system 10.

In exemplary embodiments, as best shown in FIG. 2*b*, during operation of the electronic plumbing system 10 using the voice controlled device 90, a user enters input via the voice controlled device 90 (e.g., a user states a command to the voice controlled device 90). The voice controlled device 90 receives the input from the user and sends a signal to the processor 94*a* in the third party cloud server 94 via the wireless communication connection or network interface 96. The processor 94*a* in the third party cloud server 94 receives the signal from the voice controlled device 90 and sends a signal to the processor 94*a* in the system provider cloud server 92 via the wireless communication connection or network interface 96. The processor 94*a* in the system provider cloud server 92 receives the signal from the mobile device 88 and sends a signal to the monitor 70 via the wireless communication connection or network interface 96. The monitor 70 receives the signal from the processor 92*a* in the system provider cloud server 92 and sends a signal to the processor 58 in the control module 52. The processor 58 in the control module 52 receives the signal from the monitor 70 and sends a signal to at least one of the fall sensor 66 via the wired communication connection or network interface 98, the communication device 68 via the wireless communication connection or network interface 96, the electronic valve 30 via the wired communication connection or network interface 98, and the electronic drain fitting 76 via the wireless communication connection or network interface 96. The fall sensor 66, the communication device 68, the electronic valve 30, and/or the electronic drain fitting 76 receive the signal from the processor 58 in the control module 52 and, as appropriate, activate, deactivate, or control the electronic plumbing system 10.

In exemplary embodiments, as best shown in FIG. 2*b*, during operation of the electronic plumbing system 10 using the communication device 68, a user receives output via the communication device 68 (e.g., a user receives information on the communication device 68). The fall sensor 66 detects a fall of the user and sends a signal to the processor 58 in the control module 52 via the wired communication connection or network interface 98. The processor 58 in the control module 52 receives the signal from the fall sensor 66 and sends a signal to the communication device 68 via the wireless communication connection or network interface 96. The communication device 68 receives the signal from the processor 58 in the control module 52 and conveys to a user the information regarding the fall of the user.

In exemplary embodiments, as best shown in FIG. 2*b*, during operation of the electronic plumbing system 10 using the monitor 70, a user receives output via the monitor 70 (e.g., a user receives information on the monitor 70). The fall sensor 66 detects a fall of the user and sends a signal to the processor 58 in the control module 52 via the wired communication connection or network interface 98. The processor 58 in the control module 52 receives the signal from the fall sensor 66 and sends a signal to the monitor 70 via the wireless communication connection or network interface 96. The monitor 70 receives the signal from the processor 58 in the control module 52 and conveys to a user the information regarding the fall of the user.

In exemplary embodiments, as best shown in FIG. 2*b*, during operation of the electronic plumbing system 10 using the mobile device 88, a user receives output via the mobile device 88 (e.g., a user receives information on the mobile device 88). The fall sensor 66 detects a fall of the user and sends a signal to the processor 58 in the control module 52 via the wired communication connection or network interface 98. The processor 58 in the control module 52 receives the signal from the fall sensor 66 and sends a signal to the monitor 70 via the wireless communication connection or network interface 96. The monitor 70 receives the signal from the processor 58 in the control module 52 and sends a signal to the processor 92*a* in the system provider cloud server 92. The processor 92*a* in the system provider cloud server 92 receives the signal from the monitor 70 and sends a signal to the mobile device 88 via the wireless communication connection or network interface 96. The mobile device 88 receives the signal from the processor 92*a* in the system provider cloud server 92 and conveys to a user the information regarding the fall of the user.

In exemplary embodiments, as best shown in FIG. 2*b*, during operation of the electronic plumbing system 10 using the voice controlled device 90, a user receives output via the voice controlled device 90 (e.g., a user receives information from the voice controlled device 90). The fall sensor 66 detects a fall of the user and sends a signal to the processor 94*a* in the control module 52 via the wired communication connection or network interface 98. The processor 58 in the control module 52 receives the signal from the fall sensor 66 and sends a signal to the monitor 70 via the wireless communication connection or network interface 96. The monitor 70 receives the signal from the processor 58 in the control module 52 and sends a signal to the processor 92*a* in the system provider cloud server 92. The processor 92*a* in the system provider cloud server 92 receives the signal from the monitor 70 and sends a signal to the processor 94*a* in the third party cloud server 94 via the wireless communication connection or network interface 96. The processor 92*a* in the system provider cloud server 92 receives the signal from the processor 92*a* in the system provider cloud server 92 and sends a signal to the voice controlled device 90 via the wireless communication connection or network interface 96. The voice controlled device 90 receives the signal from the processor 94*a* in the third party cloud server 94 and conveys to a user the information regarding the fall of the user.

In exemplary embodiments, the wireless communication connection(s) or network interface(s) 96 between the processor 58 in the control module 52, the communication device 68, the monitor 70, and the electronic drain fitting 76 are low power communication connection(s) or network interface(s) 96, such as Bluetooth, low power Wi-Fi, near field communication (NFC), Zigbee, and Z-Wave. In exemplary embodiments, the wireless communication connection(s) or network interface(s) 96 between the monitor 70, the system provider cloud server 92, the mobile device 88, the third party cloud server 94, and the voice controlled device 90 are high power communication connection(s) or network interface(s), such as high power Wi-Fi and cellular.

Fall Detection and Alerts

In an exemplary embodiment, the electronic plumbing system 10 includes fall detection and alerts.

In exemplary embodiments, the electronic plumbing system 10 includes a mechanism (e.g., the fall sensor 66) to detect a presence of a user and a fall of a user and a mechanism (e.g., the communication device 68, the monitor 70, and/or other user input/output devices) to receive input from a user(s) and/or provide output to a user(s) regarding a presence of a user and a fall of a user.

The fall sensor 66 is operable to define a detection zone. In exemplary embodiments, the fall sensor 66 is operable to detect a presence of a user and a fall of a user in the detection zone. In exemplary embodiments, the detection zone extends generally outwardly from the fall sensor 66. In exemplary embodiments, the detection zone extends generally outwardly from the body 18 on which the fall sensor 66 is mounted. In exemplary embodiments, the detection zone extends generally outwardly from the electronic plumbing device 12 (such as the electronic showerhead 16) on which the fall sensor 66 is mounted. More specifically, in exemplary embodiments, the detection zone extends generally outwardly from the sprayface 54 of the electronic showerhead 16 on which the fall sensor 66 is mounted. In exemplary embodiments, the detection zone includes a space inside a shower enclosure.

If the user enters the detection zone and/or falls in the detection zone, the fall sensor 66 detects the presence of the user in the detection zone and/or the fall of the user in the detection zone. The fall sensor 66 detects the presence of the user in the detection zone and/or the fall of the user in the detection zone based on predetermined parameters. For example, the presence of the user in the detection zone could require an object of a certain height (to avoid detection of an animal as a person). Similarly, the fall of the user in the detection zone could require a certain change in height of the object and a certain rate of change in the height of the object (to avoid detecting a person bending over as a fall of the person).

In exemplary embodiments, the fall sensor 66 is a radio frequency (RF) sensor. More specifically, in exemplary embodiments, the fall sensor 66 is a radar sensor. Even more specifically, in exemplary embodiments, the fall sensor 66 is a millimeter wave sensor. RF sensors, radar sensors, and millimeter wave sensors are sensors that detect a fall of a person without any physical contact with the person. However, one of ordinary skill in the art will appreciate that the fall sensor 66 could be any type of electronic sensor that can detect a fall of a person without any physical contact with the person. Other exemplary sensors include, but are not limited to, lidar sensors, time of flight (TOF) sensors, optical sensors, camera sensors, accelerometers, and microphones. In exemplary embodiments, the fall sensor 66 is a IWR6843 millimeter wave (mmWave) sensor, sold by Texas Instruments Incorporated, as described in the IWR6843, IWR6443 Single-Chip 60- to 64-GHz mmWave Sensor datasheet, revision E, dated October 2018 and revised June 2021, document number SWRS219E, and available for download at https://www.ti.com/product/IWR6843.

In exemplary embodiments, the communication device 68 and/or the monitor 70 are operable to receive input from a user(s) and/or provide output to a user(s) regarding a presence of a user in the detection zone and a fall of a user in the detection zone.

In exemplary embodiments, the communication device 68 and/or the monitor 70 are operable to provide visual feedback. In exemplary embodiments, the communication device 68 and/or the monitor 70 include a light emitting diode ("LED"). In exemplary embodiments, the LED displays different colors and/or different flashing patterns. In exemplary embodiments, a short flashing pattern is in the range of approximately 0.1 second to 0.5 second, and a long flashing pattern is greater than approximately 0.5 second. For example, the LED of the communication device 68 and/or the monitor 70 could display a short flashing pattern when the fall sensor 66 is activated and a long or no flashing pattern when the fall sensor 66 is deactivated. In exemplary embodiments, the communication device 68 and/or the monitor 70 includes a screen. In exemplary embodiments, the screen displays at least one of symbols, numbers, and characters.

In exemplary embodiments, the communication device 68 and/or the monitor 70 are operable to provide audible feedback. In exemplary embodiments, the communication device 68 and/or the monitor 70 include a voice. In exemplary embodiments, the communication device 68 and/or the monitor 70 include a beep or a tone. For example, the communication device 68 and/or the monitor 70 could make a beep or a tone when the fall sensor 66 is activated. Similarly, the communication device 68 and/or the monitor 70 could make a beep or a tone when the system is deactivated. In exemplary embodiments, the communication device 68 and/or the monitor 70 is operable to provide haptic feedback.

In exemplary embodiments, during operation of the electronic plumbing system 10, the system detects whether water is flowing through the electronic plumbing device 12 (such as the electronic showerhead 16) or whether water has been flowing through the electronic plumbing device 12 within a past predetermined period of time (e.g., within the past 5 minutes). If water is not flowing or has not been flowing, the electronic plumbing system 10 continues to monitor 70 for water flow. If water is flowing or has been flowing, the electronic plumbing system 10 detects whether a user is present in the detection zone.

Figure 4:
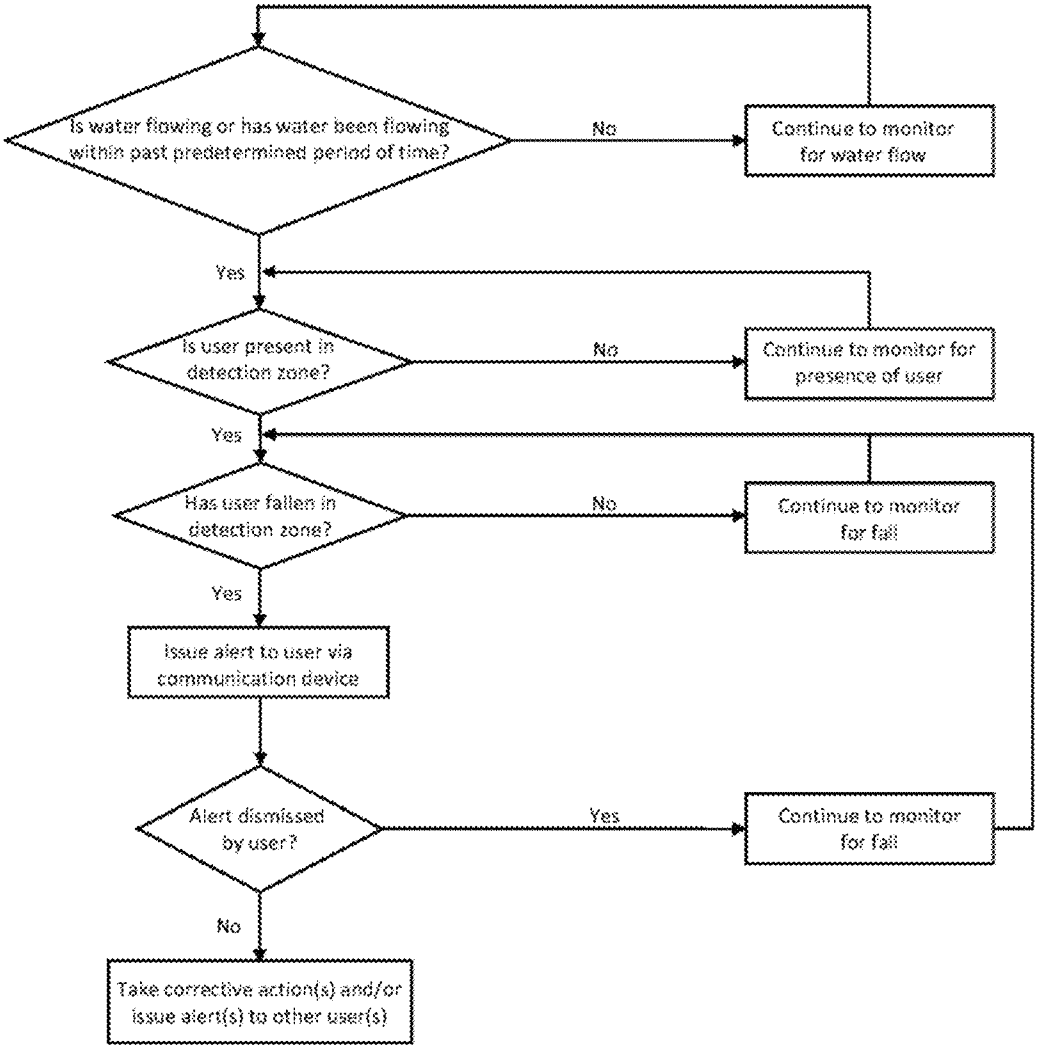
FIG. 4 is a flowchart illustrating operation of an electronic plumbing system including fall detection and alerts according to an exemplary embodiment of the present invention.

In exemplary embodiments, during continued operation of the electronic plumbing system 10, if a user is not present, the electronic plumbing system 10 continues to monitor 70 for the presence of a user. If a user is present, the electronic plumbing system 10 detects whether the user has fallen in the detection zone. If the user has not fallen, the electronic plumbing system 10 continues to monitor 70 for a fall. If the user has fallen, the electronic plumbing system 10 issues an alert to the user via the communication device 68 (e.g., by the communication device 68 lighting up or making a sound). If the alert is dismissed by the user (e.g., by the user pressing a button on the communication device 68), the electronic plumbing system 10 continues to monitor 70 for a fall. If the alert is not dismissed by the user, the electronic plumbing system 10 takes corrective action(s) and/or issues alert(s) to other user(s) (e.g., caretaker(s)). These exemplary steps are illustrated in FIG. 4.

More specifically, in exemplary embodiments, during operation of the electronic plumbing system 10, once the flow detecting device (e.g., the hydrogenerator module 80 or a flow switch) detects a flow of water through the electronic plumbing device 12, the flow detecting device sends a signal to the processor 58 in the control module 52 indicating that the flow of water has been detected. The processor 58 in the control module 52 receives the signal from the flow detecting device and sends a signal to the fall sensor 66 to activate and start detection. The fall sensor 66 receives the signal from the processor 58 in the control module 52 and starts detecting whether a user is present in the detection zone.

More specifically, in exemplary embodiments, during continued operation of the electronic plumbing system 10, once the fall sensor 66 detects a user is present, the fall sensor 66 starts detecting whether the user has fallen in the detection zone. The fall sensor 66 continues to detect whether the user has fallen. While the fall sensor 66 is detecting whether a user is present and then whether the user has fallen, the fall sensor 66 sends signals to the processor 58 in the control module 52 indicating whether a user has been detected and then whether a fall of the user has been detected. The processor 58 in the control module 52 receives the signals from the fall sensor 66.

More specifically, in exemplary embodiments, during continued operation of the electronic plumbing system 10, once the flow detecting device no longer detects the flow of water through the electronic plumbing device 12, the flow detecting device sends a signal to the processor 58 in the control module 52 indicating that the flow of water has stopped. The processor 58 in the control module 52 receives the signal from the flow detecting device and sends a signal to the fall sensor 66 to deactivate and stop detection. The fall sensor 66 receives the signal from the processor 58 in the control module 52 and stops detection a predetermined period of time after the flow of water has stopped. In an exemplary embodiment, the predetermined period of time is 5 minutes. However, one of ordinary skill in the art will appreciate that predetermined period of time could be shorter or longer and could be 0 minutes (i.e., the fall sensor 66 would stop detection immediately after the flow of water has stopped).

More specifically, in exemplary embodiments, during continued operation of the electronic plumbing system 10, once the fall sensor 66 detects a fall of the user, the fall sensor 66 sends a signal to the processor 58 in the control module 52 indicating the fall has been detected. The processor 58 in the control module 52 receives the signal from the fall sensor 66 and sends a signal to the communication device 68 to issue an alert to the user. The communication device 68 receives the signal from the processor 58 in the control module 52 and issues the alert to the user. If the communication device 68 receives input from the user to dismiss the alert, the communication device 68 sends a signal to the processor 58 in the control module 52 indicating that the user has dismissed the alert. The processor 58 in the control module 52 receives the signal from the communication device 68 and sends a signal to the fall sensor 66 to continue detection.

More specifically, in exemplary embodiments, during continued operation of the electronic plumbing system 10, if the processor 58 in the control module 52 does not receive a signal from the communication device 68, then the processor 58 in the control module 52 sends one or more signals to one or more other components of the electronic plumbing system 10 (e.g., the electronic valve 30, the electronic drain fitting 76, and the communication device 68) indicating that corrective action(s) should be taken. Each other component of the electronic plumbing system 10 receives the signal(s) from the processor 58 in the control module 52 and takes the appropriate corrective action(s). The taking of corrective action(s) could include any one or more of the following exemplary actions: (1) the electronic valve 30 turning off the flow of water from the electronic plumbing device 12, (2) the electronic drain fitting 76 opening and allowing water to drain from the vessel 34, and (3) the communication device 68 sounding a siren.

More specifically, in exemplary embodiments, during continued operation of the electronic plumbing system 10, if the processor 58 in the control module 52 does not receive a signal from the communication device 68, then the processor 58 in the control module 52 sends one or more signals to one or more other components of the electronic plumbing system 10 (e.g., the monitor 70) indicating that one or more alerts should be issued to one or more caretakers. Each other component of the electronic plumbing system 10 receives the signal(s) from the processor 58 in the control module 52 and issues the appropriate alert(s) to the caretaker(s). The issuance of the alert(s) to the caretaker(s) could include any one or more of the following exemplary actions: (1) the monitor 70 calling and/or sending a notification to a mobile device 88 of a family member or emergency contact for the user via the system provider cloud server 92, (2) the monitor 70 sending a notification to a voice controlled device 90 of an emergency contact of the user via the system provider cloud server 92 and the third party cloud server 94, and (3) the monitor 70 calling and/or sending a notification to a private and/or public emergency service personnel via the system provider cloud server 92 and/or the third party cloud server 94.

In the exemplary embodiments described above, the signals received from and sent to the components of the electronic plumbing system 10 (e.g., the fall sensor 66, the communication device 68, the monitor 70, the electronic valve 30, and the electronic drain fitting 76) to control the operation of the electronic plumbing system 10 are received from and sent to the processor 58 in the control module 52. However, as stated above, one of ordinary skill in the art will appreciate that the signals received from and sent to the components of the electronic plumbing system 10 (e.g., the fall sensor 66, the communication device 68, the monitor 70, the electronic valve 30, and the electronic drain fitting 76) could be received from and sent to the processor 72 in the monitor 70, the processor 92*a* in the system provider cloud server 92, and/or the processor 94*a* in the third party cloud server 94 in addition to or alternatively to the processor 58 in the control module 52.

In the exemplary embodiments described above, once the flow detecting device detects a flow of water through the electronic plumbing device 12, the processor 58 in the control module 52 sends a signal to the fall sensor 66 to activate and start detection. In exemplary embodiments, the electronic plumbing system 10 includes a proximity sensor. The proximity sensor is operable to define a proximity zone. In exemplary embodiments, the proximity zone extends generally outwardly from the proximity sensor. Proximity sensors are sensors that detect the presence of an object without any physical contact. In exemplary embodiments, the proximity sensor is an infrared (IR) sensor. However, one of ordinary skill in the art will appreciate that the proximity sensor could be any type of electronic sensor that can detect the presence of an object. Other exemplary sensors include, but are not limited to, radio frequency (RF) sensors, lidar sensors, radar sensors, time of flight (TOF) sensors, optical sensors, camera sensors, and capacitive sensors. In exemplary embodiments, the fall sensor 66 is also operable to activate and start detection at other times. For example, once the proximity sensor detects a presence of a user in the proximity zone, even if the flow detecting device has not detected a flow of water through the electronic plumbing device 12, the fall sensor 66 could activate and start detection.

In the exemplary embodiments described above, once the fall sensor 66 detects the fall of the user, the communication device 68 is operable to issue the alert to the user and receive input from the user to dismiss the alert. In exemplary embodiments, the communication device 68 is also operable to provide other information to the user and receive other information from the user. For example, even if the fall sensor 66 has not detected a fall of the user, the user can provide input to the communication device 68 to alert another user (e.g., a caretaker) or provide an update to another user (e.g., a caretaker).

In the exemplary embodiments described above, once the fall sensor 66 detects the fall of the user and the user has not dismissed the alert to the user, the monitor 70 is operable to issue alert(s) to other user(s) (e.g., caretaker(s)). In exemplary embodiments, the monitor 70 is also operable to provide other information to the other user(s) (e.g., caretaker(s)). For example, even if the fall sensor 66 has not detected a fall of the user, the monitor 70 can provide information to the other user(s) (e.g., caretaker(s)) regarding the presence of the user in the detection zone and the flow of water from the electronic plumbing device 12.

In the exemplary embodiments described above, the fall sensor 66 is operable to detect the fall of the user in the detection zone only while water is flowing through the body 18 and for a predetermined period of time after the flow of water has stopped. Again, the predetermined period of time could be 0 minutes. However, one of ordinary skill in the art will appreciate that the fall sensor 66 could be operable to detect the fall of the user in the detection zone during other time frames, such as any time the user is present in the detection zone or even continuously.

The following includes definitions of exemplary terms that may be used throughout the disclosure. Both singular and plural forms of all terms fall within each meaning.

"Computer" or "processor," as used herein includes, but is not limited to, one or more programmed or programmable electronic device or coordinated devices that can store, retrieve, or process data and may be any processing unit, distributed processing configuration, or processor systems. Examples of processor include microprocessors, microcontrollers, central processing units (CPUs), graphics processing units (GPUs), tensor processing unit (TPU), floating point units (FPUs), reduced instruction set computing (RISC) processors, digital signal processors (DSPs), field programmable gate arrays (FPGAs), etc., in any combination. One or more cores of a single microprocessor and/or multiple microprocessor each having one or more cores can be used to perform the operation as being executed by a processor herein. The processor can also be a processor dedicated to the training of neural networks and other artificial intelligence (AI) systems. The processor may be associated with various other circuits that support operation in the processor, such as random access memory (RAM), read-only memory (ROM), programmable read-only memory (PROM), erasable programmable read-only memory (EPROM), clocks, decoders, memory controllers, or interrupt controllers, etc. These support circuits may be internal or external to the processor or its associated electronic packaging. The support circuits are in operative communication with the processor. The support circuits are not necessarily shown separate from the processor in block diagrams or drawings.

"Network interface," synonymous with "data interface," as used herein includes, but is not limited to, any interface or protocol for transmitting and receiving data between electronic devices. The network or data interface can refer to a connection to a computer via a local network or through the internet and can also refer to a connection to a portable device—e.g., a mobile device 88 or a USB thumb drive—via a wired or wireless connection. A network interface can be used to form networks of computers to facilitate distributed and/or remote computing (i.e., cloud-based computing). "Cloud-based computing" means computing that is implemented on a network of computing devices that are remotely connected to the device via a network interface.

"Signal," as used herein includes, but is not limited to, one or more electric signals, including analog or digital signals, one or more computer instructions, a bit or bit stream, or the like.

"Logic," synonymous with "circuit," as used herein includes but is not limited to hardware, firmware, software and/or combinations of each to perform a function(s) or action(s). For example, based on a desired application or needs, logic may include a software-controlled microprocessor, discrete logic such as an application specific integrated circuit (ASIC), or other programmed logic device and/or controller. Logic may also be fully embodied as software. The logic flow of an embodiment of the invention could be embodied in logic.

"Software," as used herein includes, but is not limited to, one or more computer readable and/or executable instructions that cause a computer, processor, logic, and/or other electronic device to perform functions, actions, and/or behave in a desired manner. The instruments may be embodied in various forms such as routines, algorithms, modules, or programs including separate applications or code from dynamically linked sources or libraries (DLLs). Software may also be implemented in various forms such as a stand-alone program, a web-based program, a function call, a subroutine, a servlet, an application, an app, an applet (e.g., a Java applet), a plug-in, instructions stored in a memory, part of an operating system, or other type of executable instructions or interpreted instructions from which executable instructions are created. The logic flow of an embodiment of the invention could be embodied in software.

"Module" or "engine" as used herein will be appreciated as comprising various configurations of computer hardware and/or software implemented to perform operations. In some embodiments, modules or engines as described herein may be represented as instructions operable to be executed by a processor in a processor or memory. In other embodiments, modules or engines as described herein may be represented as instructions read or executed from readable media. A module or engine may operate in either hardware or software according to application specific parameters or user settings. It will be appreciated by those of skill in the art that such configurations of hardware and software may vary, but remain operable in substantially similar ways. The logic flow of an embodiment of the invention could be embodied in a module or engine.

"Data storage device," as used herein includes, but is not limited to, a device or devices for non-transitory storage of code or data, e.g., a device with a non-transitory computer readable medium. As used herein, "non-transitory computer readable medium" mean any suitable non-transitory computer readable medium for storing code or data, such as a magnetic medium, e.g., fixed disks in external hard drives, fixed disks in internal hard drives, and flexible disks; an optical medium, e.g., CD disk, DVD disk; and other media, e.g., ROM, PROM, EPROM, EEPROM, flash PROM, external memory drives, etc. The memory of an embodiment of the invention could be embodied in a data storage device.

While the above exemplary definitions have been provided, it is intended that the broadest reasonable interpretation consistent with this specification be used for these and other terms. Aspects and implementations of the present disclosure will be understood more fully from the detailed description given above and from the accompanying drawings of the various aspects and implementations of the disclosure. This should not be taken to limit the disclosure to the specific aspects or implementations, but is for explanation and understanding only.

One of ordinary skill in the art will now appreciate that the present invention provides an electronic plumbing system including fall detection and alerts. Although the present invention has been shown and described with reference to particular embodiments, equivalent alterations and modifications will occur to those skilled in the art upon reading and understanding this specification. The present invention includes all such equivalent alterations and modifications and is limited only by the scope of the following claims in light of their full scope of equivalents.

What is claimed is:

1. A system comprising:

a body, the body operable to be mounted on a surface, the body including a discharge outlet, the discharge outlet operable to deliver water;

a user input/output module, the user input/output module operable to communicate with a user regarding operation of the system, the user input/output module including:

a fall sensor, the fall sensor operable to be mounted on the body, the fall sensor operable to define a detection zone, the fall sensor operable to detect a fall of a user in the detection zone, and at least one of:

a communication device, the communication device operable to be mounted within a first proximity to the body, and a monitor, the monitor operable to be mounted within a second proximity to the body; and a processor, the processor operable to communicate with the fall sensor and at least one of the communication device and the monitor regarding the operation of the system;

wherein the fall sensor is operable to detect a fall of a user in the detection zone and to send a signal to the processor indicating the detected fall of the user in the detection zone;

wherein the processor is operable to receive the signal from the fall sensor and to send a signal to at least one of the communication device and the monitor in response to the detected fall of the user in the detection zone;

wherein at least one of:

the communication device is operable to receive the signal from the processor and to communicate with the user regarding the detected fall of the user in the detection zone, and the monitor is operable to receive the signal from the processor and to communicate with a caretaker regarding the detected fall of the user in the detection zone; and wherein the fall sensor is operable to detect the fall of the user in the detection zone only while water is flowing through the body and for a predetermined period of time after the flow of water has stopped.

2. The system of claim 1, wherein the body includes a sprayface;

wherein the fall sensor is operable to be mounted on the sprayface of the body.

3. The system of claim 2, wherein the body includes a plurality of discharge outlets; and wherein the fall sensor is surrounded by the discharge outlets.

4. The system of claim 2, wherein the detection zone extends generally outwardly from the sprayface of the body.

5. The system of claim 2, further comprising a control module;

wherein the control module is operable to be mounted on the sprayface of the body.

6. The system of claim 5, wherein the body includes a plurality of discharge outlets; and wherein the control module is surrounded by the discharge outlets.

7. The system of claim 2, wherein the communication device is operable to receive the signal from the processor and to issue an alert to the user regarding the detected fall of the user in the detection zone; and wherein the communication device is operable to receive an input from the user to dismiss the alert regarding the detected fall of the user in the detection zone.

8. The system of claim 1, wherein the user input/output module includes the communication device;

wherein the processor is operable to communicate with the communication device regarding the operation of the system;

wherein the processor is operable to send a signal to the communication device in response to the detected fall of the user in the detection zone;

wherein the communication device is operable to receive the signal from the processor and to issue an alert to the user regarding the detected fall of the user in the detection zone; and wherein the communication device is operable to receive an input from the user to dismiss the alert regarding the detected fall of the user in the detection zone.

9. The system of claim 8, wherein the communication device includes a button; and wherein the button is operable to be pressed by the user to dismiss the alert regarding the detected fall of the user in the detection zone.

10. The system of claim 8, wherein the user input/output module includes the monitor;

wherein the processor is operable to communicate with the monitor regarding the operation of the system;

wherein the processor is operable to send a signal to the monitor in response to the detected fall of the user in the detection zone; and wherein the monitor is operable to receive the signal from the processor and to communicate with the caretaker regarding the detected fall of the user in the detection zone.

11. The system of claim 10, wherein, if the communication device receives the input from the user to dismiss the alert regarding the detected fall of the user in the detection zone, the monitor does not communicate with the caretaker regarding the detected fall of the user in the detection zone.

12. The system of claim 8, wherein the body includes a sprayface; and wherein the fall sensor is operable to be mounted on the sprayface of the body.

13. The system of claim 1, wherein the user input/output module includes the communication device;

wherein the processor is operable to communicate with the communication device and the monitor regarding the operation of the system;

wherein the processor is operable to send a signal to the communication device and the monitor in response to the detected fall of the user in the detection zone;

wherein the communication device is operable to receive the signal from the processor and to communicate with the user regarding the detected fall of the user in the detection zone; and wherein the monitor is operable to receive the signal from the processor and to communicate with the caretaker regarding the detected fall of the user in the detection zone.

14. The system of claim 13, wherein the first proximity within which the communication device is mounted to the body is less than the second proximity within which the monitor is mounted to the body.

15. The system of claim 13, wherein the communication device is operable to be mounted on the surface on which the body is mounted.

16. The system of claim 13, wherein the monitor is operable to be mounted on a surface in a vicinity of the surface on which the body is mounted.

17. The system of claim 13, wherein the body includes a sprayface; and wherein the fall sensor is operable to be mounted on the sprayface of the body.

18. The system of claim 13, wherein the communication device is operable to issue an alert to the user regarding the detected fall of the user in the detection zone; and wherein the communication device is operable to receive an input from the user to dismiss the alert regarding the detected fall of the user in the detection zone.

19. A system comprising:

a body, the body operable to be mounted on a surface, the body including a discharge outlet, the discharge outlet operable to deliver water;

a valve, the valve operable to permit flow of water through the discharge outlet when the valve is activated and to not permit flow of water through the discharge outlet when the valve is deactivated;

a user input/output module, the user input/output module operable to communicate with a user regarding operation of the system, the user input/output module including:

a fall sensor, the fall sensor operable to be mounted on the body, the fall sensor operable to define a detection zone, the fall sensor operable to detect a fall of a user in the detection zone, and at least one of:

a communication device, the communication device operable to be mounted within a first proximity to the body, and a monitor, the monitor operable to be mounted within a second proximity to the body; and a processor, the processor operable to communicate with the fall sensor and at least one of the communication device and the monitor regarding the operation of the system;

wherein the fall sensor is operable to detect a fall of a user in the detection zone and to send a signal to the processor indicating the detected fall of the user in the detection zone;

wherein the processor is operable to receive the signal from the fall sensor and to send a signal to at least one of the communication device and the monitor in response to the detected fall of the user in the detection zone;

wherein at least one of:

the communication device is operable to receive the signal from the processor and to communicate with the user regarding the detected fall of the user in the detection zone, and the monitor is operable to receive the signal from the processor and to communicate with a caretaker regarding the detected fall of the user in the detection zone; and wherein the fall sensor is operable to detect the fall of the user in the detection zone only while water is flowing through the body and for a predetermined period of time after the flow of water has stopped.

20. A system comprising:

a body, the body operable to be mounted on a surface, the body including a discharge outlet, the discharge outlet operable to deliver water;

an electronic valve, the electronic valve operable to permit flow of water through the discharge outlet when the electronic valve is activated and to not permit flow of water through the discharge outlet when the electronic valve is deactivated;

a user input/output module, the user input/output module operable to communicate with a user regarding operation of the system, the user input/output module including:

a fall sensor, the fall sensor operable to be mounted on the body, the fall sensor operable to define a detection zone, the fall sensor operable to detect a fall of a user in the detection zone, and at least one of:

a communication device, the communication device operable to be mounted within a first proximity to the body, and a monitor, the monitor operable to be mounted within a second proximity to the body; and a processor, the processor operable to communicate with the fall sensor and at least one of the electronic valve, the communication device, and the monitor regarding the operation of the system;

wherein the fall sensor is operable to detect a fall of a user in the detection zone and to send a signal to the processor indicating the detected fall of the user in the detection zone;

wherein the processor is operable to receive the signal from the fall sensor and to send a signal to at least one of the electronic valve, the communication device, and the monitor in response to the detected fall of the user in the detection zone;

wherein at least one of:

the electronic valve is operable to receive the signal from the processor and to control the water flowing through the discharge outlet, the communication device is operable to receive the signal from the processor and to communicate with the user regarding the detected fall of the user in the detection zone, and the monitor is operable to receive the signal from the processor and to communicate with a caretaker regarding the detected fall of the user in the detection zone; and wherein the fall sensor is operable to detect the fall of the user in the detection zone only while water is flowing through the body and for a predetermined period of time after the flow of water has stopped.

* * * * *